United States Patent
Welchko et al.

(10) Patent No.: US 8,100,799 B2
(45) Date of Patent: Jan. 24, 2012

(54) METHOD AND SYSTEM FOR CONTROLLING POWER INVERTERS IN ELECTRIC DRIVES OF VEHICLES WITH TWO-MODE TRANSMISSIONS

(75) Inventors: Brian A. Welchko, Torrance, CA (US); Steven E. Schulz, Torrance, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1168 days.

(21) Appl. No.: 11/853,884

(22) Filed: Sep. 12, 2007

(65) Prior Publication Data

US 2009/0069142 A1  Mar. 12, 2009

(51) Int. Cl.
*F16H 3/72* (2006.01)
(52) U.S. Cl. ............................................. 475/5; 318/811
(58) Field of Classification Search .................. None
See application file for complete search history.

(56) References Cited

U.S. PATENT DOCUMENTS

| 5,657,216 A * | 8/1997 | Kaura ........................ 363/41 |
| 6,023,417 A * | 2/2000 | Hava et al. ................. 363/41 |
| 2006/0128513 A1* | 6/2006 | Tata et al. ...................... 475/5 |

* cited by examiner

*Primary Examiner* — David D Le
*Assistant Examiner* — Erin D Bishop
(74) *Attorney, Agent, or Firm* — Ingrassia Fisher & Lorenz, P.C.

(57) ABSTRACT

Methods and systems for driving an automobile are provided. The system includes a prime mover power source and a two-mode, compound-split, electro-mechanical transmission, including first and second motors, coupled to the prime mover power source, a power inverter coupled to the first and second motors, and a processor coupled to the first and second motors and the power inverter. The processor is configured to modify a signal controlling the power inverter utilizing a first voltage distortion compensation method if a modulation index of the signal is less than a first modulation index value and modify the signal utilizing a second voltage distortion compensation method if the modulation index is at least equal to the first modulation index value.

14 Claims, 9 Drawing Sheets

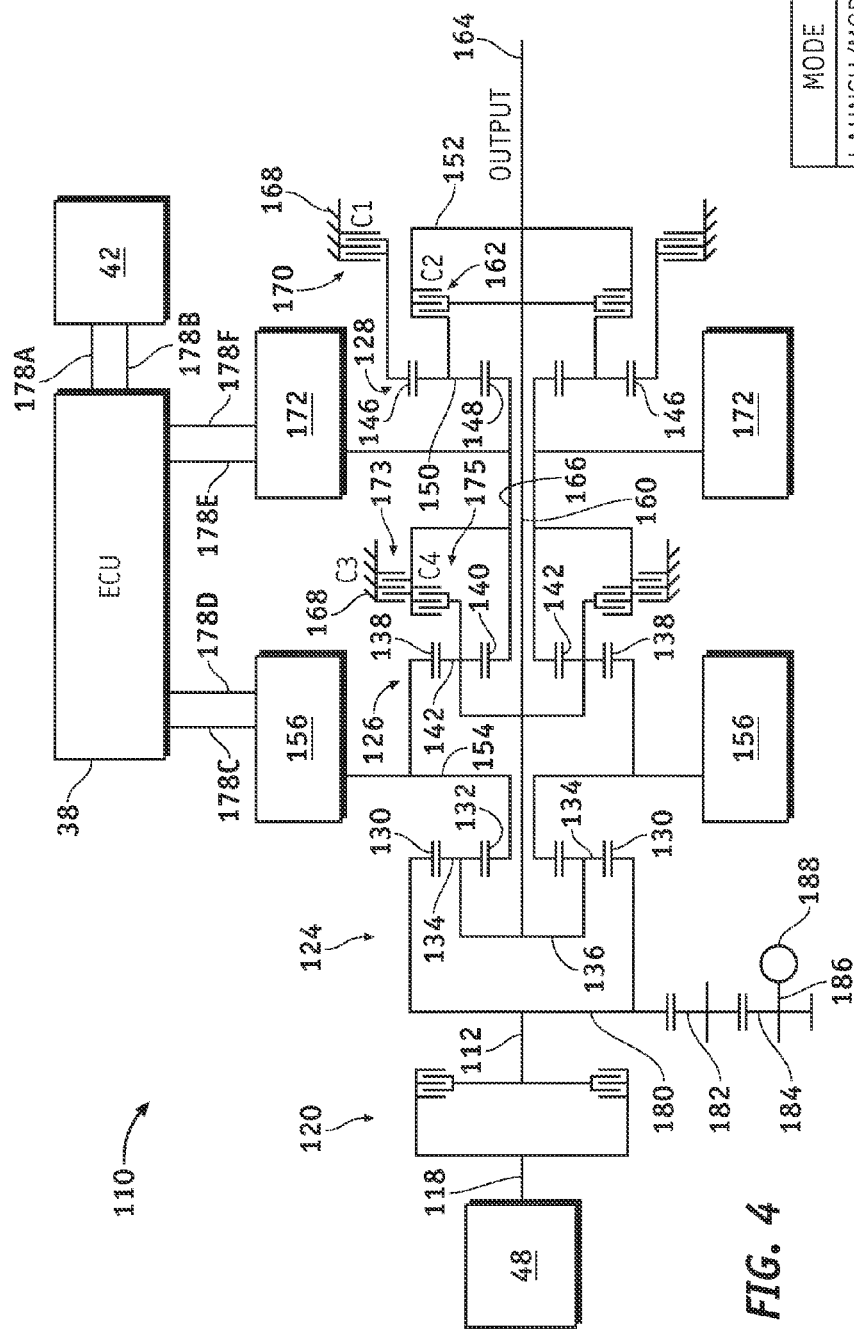

METHOD AND SYSTEM FOR CONTROLLING POWER INVERTERS IN ELECTRIC DRIVES OF VEHICLES WITH TWO-MODE TRANSMISSIONS

TECHNICAL FIELD

The present invention generally relates to power inverters, and more particularly relates to methods and systems for controlling power inverters in electric drive systems of automobiles utilizing two-mode transmissions.

BACKGROUND OF THE INVENTION

In recent years, advances in technology, as well as ever evolving tastes in style, have led to substantial changes in the design of automobiles. One of the changes involves the complexity of the electrical and drive systems within automobiles, particularly alternative fuel vehicles, such as hybrid, electric, and fuel cell vehicles. Such alternative fuel vehicles typically use an electric motor, perhaps in combination with another actuator, to drive the wheels.

Discontinuous Pulse Width Modulation (DPWM) methods are often employed for controlling the switching action of three phase voltage source inverters which are used to control the phase currents of three-phase alternating current (AC) motors. A significant advantage of DPWM methods over continuous PWM methods, such as sinusoidal or space vector modulation, is reduced inverter switching losses, which helps to improve the efficiency of hybrid electric vehicles, particularly when only the electric motors are in use. DPWM methods differ from continuous PWM methods in that only one zero vector is used in a given switching cycle. As a result, each switch in a three phase inverter is typically not switched for 60° segments of an electrical cycle. The location of the 60° clamped segment with respect to the inverter output voltage and load power factor determines the type of DPWM method and resulting PWM properties.

Ideally, the switch pairs in each phase leg of the three-phase voltage source inverter each operate in a complimentary fashion such that one switch is always "on" and the other switch is always "off." In practice, however, a blanking time, or dead-time, is typically inserted during each transition of a switching state of the voltage source inverter. The dead-time is a short interval during which both switches are gated "off." This prevents both switches in a phase leg of the voltage source inverter from simultaneously being "on," which could short-circuit the voltage source inverter.

Additionally, the gate drive circuitry may have limitations or the switches may impose limitations on the minimum "on" time duration that is commanded (e.g., directed by a control module, processor, or the like) to a switch in the voltage source inverter. The minimum pulse width and dead-time limitations result in finite minimum (e.g., non-zero) and maximum (e.g., non-unity) values of duty cycle which can be commanded by the controller (e.g., a DPWM modulator).

These non-linear effects, dead-time and minimum pulse width, introduce distortion on ideal inverter output voltages as produced by DPWM control. Since DPWM control offers reduced losses compared to continuous PWM methods, it is desirable to employ DPWM control methods while simultaneously minimizing the distortion caused by the non-linear inverter effects. Various compensation methods have recently been developed to reduce the distortion effects of inverter non-linearities on DPWM control. However, the various compensation methods have not been employed under a single, unitary control method.

Another challenge is to provide a drive system that will operate at high efficiencies over a wide variety of operating conditions. Desirable transmissions used in such drive systems should leverage the benefits of a series, hybrid transmission for desirable low-average power duty cycles—i.e., low speed start/stop duty cycles—as well as the benefits of a parallel hybrid transmission for high-average output power, high speed duty cycles.

Accordingly, it is desirable to provide a control method that employs the DPWM compensation method most suitable for the current system operating conditions, particularly in an automobile that utilizes a transmission that includes the benefits of both series and parallel hybrid transmissions. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, an automotive drive system is provided. The system includes a prime mover power source and a two-mode, compound-split, electro-mechanical transmission, including first and second motors, coupled to the prime mover power source, a power inverter coupled to the first and second motors, and a processor coupled to the first and second motors and the power inverter. The processor is configured to modify a signal controlling the power inverter utilizing a first voltage distortion compensation method if a modulation index of the signal is less than a first modulation index value and modify the signal utilizing a second voltage distortion compensation method if the modulation index is at least equal to the first modulation index value.

In another embodiment, an automotive drive system is provided. The system includes a prime mover power source, a two-mode, compound-split, electro-mechanical transmission coupled to the prime mover power source, a power inverter coupled to the first and second motors, an energy storage device coupled to the power inverter, and a processor coupled to the first and second motors and the power inverter. The transmission includes an input member to receive power from the prime mover, an output member to deliver power from the transmission, first and second motors being coaxially aligned, first, second, and third coaxially aligned planetary gear arrangements, each planetary gear arrangement utilizing first, second and third gear members, the first and second motors being coaxially aligned with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member, a first torque-transmitting mechanism to selectively connect one of the gear members associated with each of the planetary gear arrangements to each other and to the output member, a second torque-transmitting mechanism to selectively connect one of the gear members of the third planetary gear set with ground, a third torque-transmitting mechanism to selectively connect one of the gear members of the second planetary gear set with another of the gear members of the second planetary gear set, a first interconnecting member continuously connecting one of the members of the first planetary gear set with one of the members of the second planetary gear set, and a second interconnecting member continuously connecting one of the members of the second planetary gear set with one of the members of the third planetary gear set. The processor is configured to modify a signal controlling the power inverter utilizing a first voltage distortion compensation method if a modulation index of the signal is less than a first modulation index value and modify the signal utilizing a second voltage distortion compensation method to the signal if the modulation index is at least equal to the first modulation index value.

In a further embodiment, an automotive drive system is provided. The system includes an internal combustion engine, a two-mode, compound-split, electro-mechanical transmission coupled to the internal combustion engine, a power inverter coupled to the first and second motors, at least one battery coupled to the power inverter, and a processor coupled to the first and second motors and the power inverter. The transmission includes an input member to receive power from the internal combustion engine, an output member to deliver power from the transmission, first and second motors being coaxially aligned, first, second, and third coaxially aligned planetary gear arrangements, each planetary gear arrangement utilizing first, second and third gear members, the first and second motors being coaxially aligned with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member, a first torque-transmitting mechanism to selectively connect one of the gear members associated with each of the planetary gear arrangements to each other and to the output member, a second torque-transmitting mechanism to selectively connect one of the gear members of the third planetary gear set with ground, a third torque-transmitting mechanism to selectively connect one of the gear members of the second planetary gear set with another of the gear members of the second planetary gear set, a first interconnecting member continuously connecting one of the members of the first planetary gear set with one of the members of the second planetary gear set and a second interconnecting member continuously connecting one of the members of the second planetary gear set with one of the members of the third planetary gear set. The processor is configured to modify to a signal, having a minimum pulse width and a maximum pulse width, controlling the power inverter utilizing a first voltage distortion compensation method if a modulation index of the signal is less than a first modulation index value and modify the signal utilizing a second voltage distortion compensation method if the modulation index is at least equal to the first modulation index value.

In the first voltage distortion compensation method, the signal is received and a duty cycle of the signal has a range from a minimum achievable duty cycle to a maximum achievable duty cycle. A second signal is produced if the duty cycle of the signal is within an output voltage distortion range outside of the minimum and maximum pulse widths and less than a first clipping value. The second signal has the minimum achievable duty cycle. A third signal is produced if the duty cycle of the signal is within the output voltage distortion range and one of the duty cycle of the signal is at least equal to the first clipping value or the duty cycle of the signal is not greater than a second clipping value. The third signal has a closer one of the minimum and maximum pulse widths to the duty cycle of the signal, and the second clipping value is greater than the first clipping value. A fourth signal is produced if the duty cycle of the signal is within the output voltage distortion range and greater than the second clipping value. The fourth signal has the maximum achievable duty cycle. One of the second, third, and fourth signals is provided to the power inverter.

In the second voltage distortion compensation method, an output voltage vector of the power inverter is monitored. The power inverter has a switching cycle with a plurality of phase legs and a zero vector. The output voltage vector is based on the switching cycle of the power inverter. A modified switching cycle is produced by modifying a duty cycle of each of the plurality of phase legs by a duty cycle of the zero vector when the output voltage vector is in a distortion region. An output signal having the modified switching cycle is provided to the power inverter.

DESCRIPTION OF THE DRAWINGS

The present invention will hereinafter be described in conjunction with the following drawing figures, wherein like numerals denote like elements.

FIG. 4 is a schematic view of a two-mode, compound-split, electro-mechanical transmission within the automobile of FIG. 1;

FIG. 5 is a truth table presenting fixed ratios for the operation of the transmission of FIG. 4;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment. It should also be understood that FIGS. 1-21 are merely illustrative and may not be drawn to scale.

FIG. 1 to FIG. 21 illustrate an automotive drive system. The system includes a prime mover power source and a two-mode, compound-split, electro-mechanical transmission, including first and second motors, coupled to the prime mover power source, a power inverter coupled to the first and second motors, and at least one processor coupled to the first and second motors and the power inverter. The at least one processor is configured to apply a first voltage distortion compensation method to a signal controlling the power inverter if a modulation index of the signal is less than a first modulation index value, and apply a second voltage distortion compensation method to the signal if the modulation index is greater than or equal to the first modulation index value.

Figure 1:
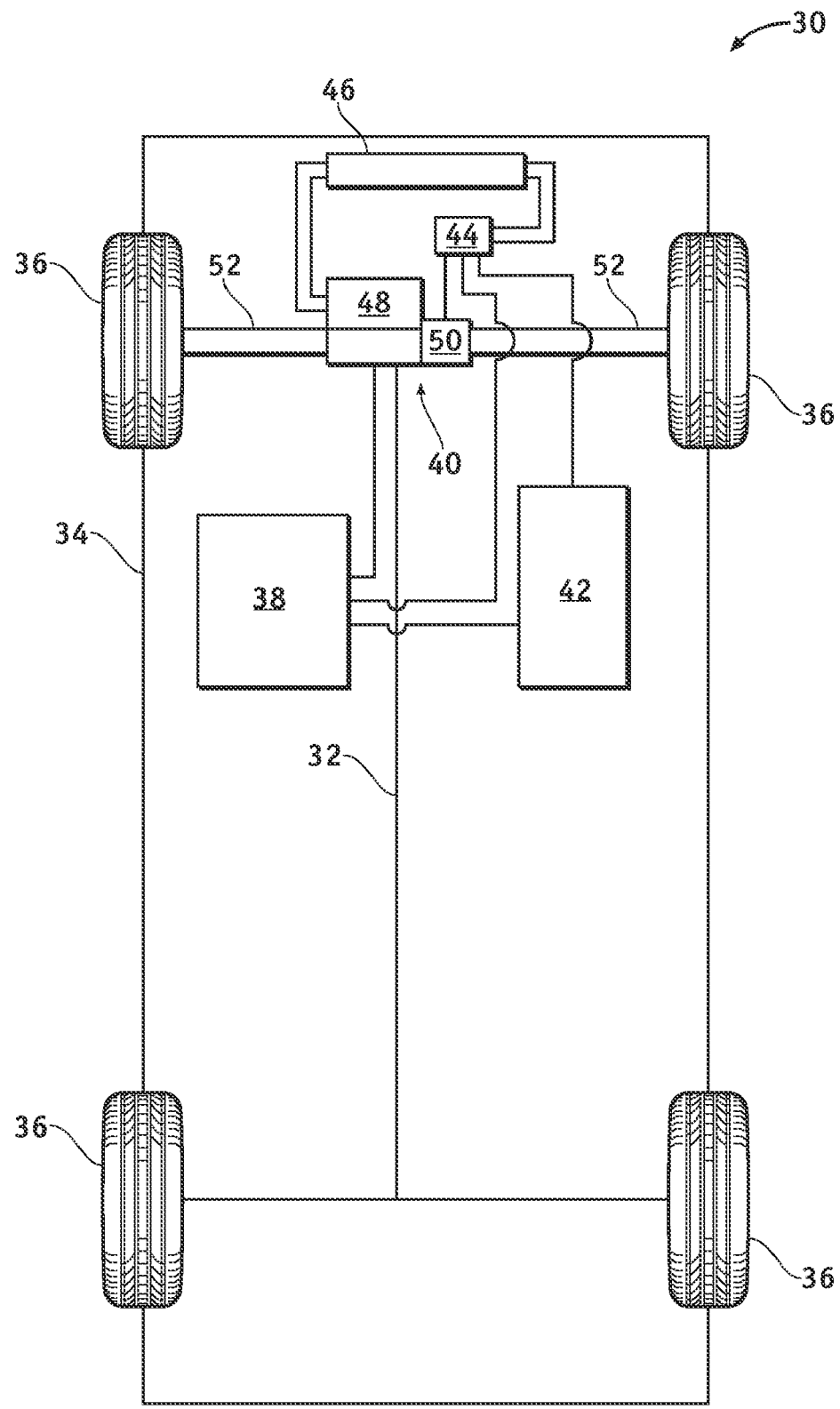
FIG. 1 is a schematic view of an exemplary automobile according to one embodiment of the present invention.

FIG. 1 illustrates a vehicle 30, or "automobile," according to one embodiment of the present invention. The automobile 30 includes a chassis 32, a body 34, four wheels 36, and an electronic control system (or electronic control unit (ECU)) 38. The body 34 is arranged on the chassis 32 and substantially encloses the other components of the automobile 30. The body 34 and the chassis 32 may jointly form a frame. The wheels 36 are each rotationally coupled to the chassis 32 near a respective corner of the body 34.

The automobile 30 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 30 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the automobile 30 is a hybrid vehicle, and further includes an actuator assembly (or powertrain) 40, a battery 42, a power inverter (or inverter) 44, and a radiator 46. The powertrain 40 includes an internal combustion engine 48 and an electric motor (or motor/generator) system 50. As will be described in greater detail below, the electric motor system 50, in one embodiment, includes two sinusoidally-wound alternating current (AC) motor/generators (or motors) (e.g., permanent magnet or induction) such as commonly used in automotive vehicles (e.g., traction drive control systems, and the like). As will be appreciated by one skilled in the art, each of the electric motors includes a stator assembly (including conductive coils), a rotor assembly (including a ferromagnetic core), and a cooling fluid (i.e., coolant). The stator assembly and/or the rotor assembly within the electric motors may include multiple (e.g., sixteen) electromagnetic poles, as is commonly understood.

Still referring to FIG. 1, and as described in greater detail below, the combustion engine 48 and the electric motor system 50 are integrated such that both are mechanically coupled to at least some of the wheels 36 through one or more drive shafts 52. The radiator 46 is connected to the frame at an outer portion thereof and although not illustrated in detail, includes multiple cooling channels therethough that contain a cooling fluid (i.e., coolant) such as water and/or ethylene glycol (i.e., "antifreeze) and is coupled to the engine 48 and the inverter 44. Referring again to FIG. 1, in the depicted embodiment, the inverter 44 receives and shares coolant with the electric motor 50. The radiator 46 may be similarly connected to the inverter 44 and/or the electric motor 50.

The electronic control system 38 is in operable communication with the actuator assembly 40, the battery 42, and the inverter 44. Although not shown in detail, the electronic control system 38 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below.

Figure 2:
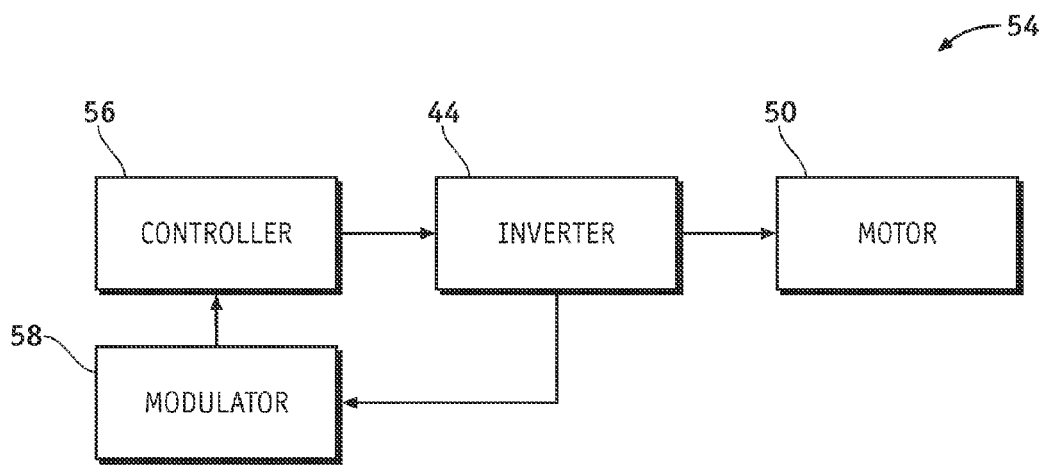
FIG. 2 is a block diagram of a voltage source inverter system within the automobile of FIG. 1.

Referring to FIG. 2, a voltage source inverter system (or electric drive system) 54 is shown in accordance with an exemplary embodiment of the present invention. The voltage source inverter system 54 includes a controller 56, the inverter 44 coupled to an output of the controller 56, the motor 50 coupled to a first output of the inverter 44, and a modulator 58 having an input coupled to a second output of the inverter 44 and having an output coupled to an input of the controller 56. The controller 56 and the modulator 58 may be integral with the electronic control system 38 shown in FIG. 1.

Figure 3:
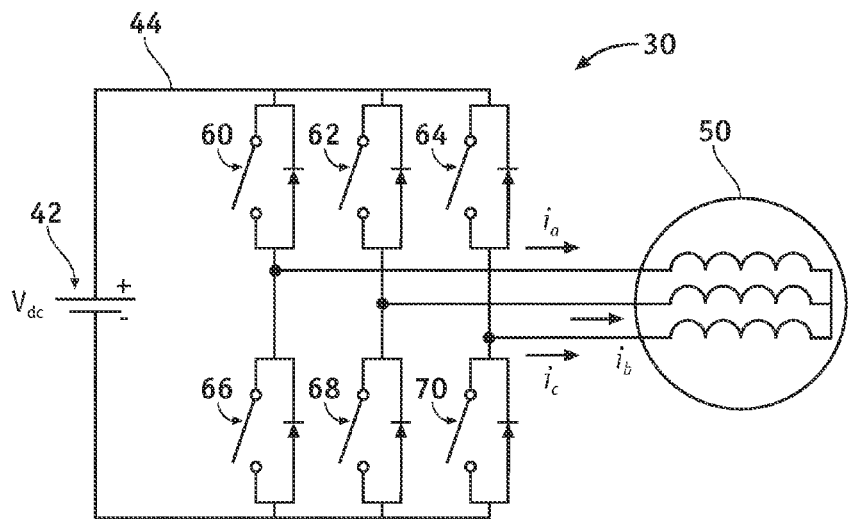
FIG. 3 is a schematic view of an inverter within the automobile of FIG. 1.

FIG. 3 illustrates the inverter 44 of FIGS. 1 and 2 in greater detail. The inverter 44 includes a three-phase circuit coupled to the motor 50. More specifically, the inverter 44 includes a switch network having a first input coupled to a voltage source $V_{dc}$ (e.g., the battery 42) and an output coupled to the motor 50. Although a single voltage source is shown, a distributed direct current (DC) link with two series sources may be used.

The switch network comprises three pairs of series switches with antiparallel diodes (i.e., antiparallel to each switch) corresponding to each of the phases. Each of the pairs of series switches comprises a first switch (or transistor) 60, 62, and 64 having a first terminal coupled to a positive electrode of the voltage source 42 and a second switch 66, 68, and 70 having a second terminal coupled to a negative electrode of the voltage source 42 and having a first terminal coupled to a second terminal of the respective first switch 60, 62, and 64. To monitor the switching cycle and output voltage vector of the inverter 44, the modulator 58 is coupled to the output of the inverter 44.

FIG. 4 illustrates the powertrain 40 and/or a transmission 110 within the automobile 30 (FIG. 1), according to an exemplary embodiment. The depicted embodiment is a two-mode, compound-split, electro-mechanical (or hybrid) transmission. The hybrid transmission 110 has an input member 112 that may be in the nature of a shaft which may be directly driven by the combustion engine 48. A transient torque damper may be incorporated between an output shaft 118 of the engine 48 and the input member 112 of the hybrid transmission 110. An example of a transient torque damper of the type recommended for the present usage is disclosed in detail in U.S. Pat. No. 5,009,301 which issued on Apr. 23, 1991 to General Motors Corporation, which is hereby incorporated by reference in its entirety. The transient torque damper may incorporate, or be employed in conjunction with, a torque transfer device 120 to permit selective engagement of the engine 48 with the hybrid transmission 110, but it should be understood that the torque transfer device 120 is not utilized to change, or control, the mode in which the hybrid transmission 110 operates.

In the embodiment depicted, the engine 48 (or prime mover power source) may be a fossil fuel engine, such as a diesel engine that is readily adapted to provide its available power output delivered at a constant number of revolutions per minute (RPM). Irrespective of the means by which the engine 48 is connected to the input member 112 of the transmission 110, the input member 112 is connected to a planetary gear set 124 in the transmission 110.

The hybrid transmission 110 utilizes three planetary gear sets (or arrangements) 124, 126, and 128. The first planetary gear set 124 has an outer gear member 130 that may generally be designated as the ring gear, which circumscribes an inner gear member 132, generally designated as the sun gear. A plurality of planet gear members 134 are rotatably mounted on a carrier 136 such that each planet gear member 134 meshingly engages both the outer gear member 130 and the inner gear member 132.

The second planetary gear set 126 also has an outer gear member 138, generally designated as the ring gear, which circumscribes an inner gear member 140, generally designated as the sun gear. A plurality of planet gear members 142 are rotatably mounted on a carrier 144 such that each planet gear 142 meshingly engages both the outer gear member 138 and the inner gear member 140.

The third planetary gear set 128 also has an outer gear member 146, generally designated as the ring gear, which circumscribes an inner gear member 148, generally designated as the sun gear. A plurality of planet gear members 150 are rotatably mounted on a carrier 152 such that each planet gear 150 meshingly engages both the outer gear member 146 and the inner gear member 148.

In one embodiment, the ring gear/sun gear tooth ratio of the first planetary gear set 124 is 65/33, the ring gear/sun gear tooth ratio of the second planetary gear set 126 is 65/33, and the ring gear/sun gear tooth ratio of the third planetary gear set 128 is 94/34.

While all three planetary gear sets 124, 126 and 128 are "simple" planetary gear sets in their own right, the first and second planetary gear sets 124 and 126 are compounded in that the inner gear member 132 of the first planetary gear set 124 is conjoined, as through a hub plate gear 154, to the outer gear member 138 of the second planetary gear set 126. The conjoined inner gear member 132 of the first planetary gear set 124 and the outer gear member 138 of the second planetary gear set 126 are continuously connected to a first motor/generator 156.

The planetary gear sets 124 and 126 are further compounded in that the carrier 136 of the first planetary gear set 124 is conjoined, as through a shaft 160, to the carrier 144 of the second planetary gear set 126. As such, carriers 136 and 144 of the first and second planetary gear sets 124 and 126, respectively, are conjoined. The shaft 160 is also selectively connected to the carrier 152 of the third planetary gear set 128, as through a torque transfer device 162 which, as will be hereinafter more fully explained, is employed to assist in the selection of the operational modes of the hybrid transmission 110.

The carrier 152 of the third planetary gear set 128 is connected directly to the transmission output member 164. When the hybrid transmission 110 is used in a land vehicle, the output member 164 may be connected to the vehicular axles (not shown) that may, in turn, terminate in the drive shafts 52 (shown in FIG. 1).

The inner gear member 140 of the second planetary gear set 126 is connected to the inner gear member 148 of the third planetary gear set 128, as through a sleeve shaft 166 that circumscribes shaft 160. The outer gear member 146 of the third planetary gear set 128 is selectively connected to ground, represented by the transmission housing 168, through a torque transfer device 170. The torque transfer device 170, as is also hereinafter explained, is also employed to assist in the selection of the operational modes of the hybrid transmission 110. The sleeve shaft 166 is also continuously connected to a second motor/generator 172. All the planetary gear sets 124, 126 and 128 as well as the two motor/generators 156 and 172 are coaxially oriented, as about the axially disposed shaft 160. It should be noted that both motor/generators 156 and 172 are of an annular configuration which permits them to circumscribe the three planetary gear sets 124, 126 and 128 such that the planetary gear sets 124, 126 and 128 are disposed radially inwardly of the motor/generators 156 and 172. This configuration assures that the overall envelope— i.e., the circumferential dimension—of the transmission 110 is minimized.

A torque transfer device 173 selectively connects the sun gear 140 with ground (i.e., with transmission housing 168). A torque transfer device 175 is operative as a lock-up clutch, locking planetary gear sets 124, 126, motors 156, 172 and the input to rotate as a group, by selectively connecting the sun gear 140 with the carrier 144. The torque transfer devices 162, 170, 173, 175 are all friction clutches.

As was previously herein explained in conjunction with the description of the engine 48, it should similarly be understood that the rotational speed and horsepower output of the first and second motor/generators 156 and 172 are also not critical to the invention, but for the purpose of effecting an absolutely clear understanding of the hybrid transmission 110, the motors/generators 156 and 172 have a continuous rating of 30 horsepower and a maximum speed of approximately 10200 RPM. The continuous power rating is approximately ⅒ that of the engine 48, and the maximum speed is approximately 1.5× that of the engine 48, although these depend on the type of engine, final gear schematic and duty cycle.

As should be apparent from the foregoing description, and with particular reference to FIG. 2, the transmission 110 selectively receives power from the engine 48. As will now be explained, the hybrid transmission 110 also receives power from the battery 42. The ECU 38 via transfer conductors 178A and 178B. The ECU 38 communicates with the first motor/generator 156 by transfer conductors 178C and 178D, and the ECU 38 similarly communicates with the second motor/generator 172 by transfer conductors 178E and 178F.

As apparent from the previous paragraph, a particular structural member, component or arrangement may be employed at more than one location. When referring generally to that type of structural member, component or arrangement, a common numerical designation will be employed.

However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 178, but the specific, individual transfer conductors are, therefore, identified as 178A, 178B, 178C, 178D, 178E and 178F in the specification and on the drawings. This same suffix convention shall be employed throughout the specification.

A drive gear 180 may be presented from the input member 112. As depicted, the drive gear 180 fixedly connects the input member 112 to the outer gear member 130 of the first planetary gear set 124, and the drive gear 180, therefore, receives power from the engine 48 and/or the motor/generators 156 and/or 172. The drive gear 180 meshingly engages an idler gear 182 which, in turn, meshingly engages a transfer gear 184 that is secured to one end of a shaft 186. The other end of the shaft 186 may be secured to a transmission fluid pump and/or PTO unit, designated either individually or collectively at 188.

The ECU 38 obtains information from both the first and second motor/generators 156 and 172, respectively, the engine 48 and the battery 42. In response to an operator's action, or "operator demand" (e.g., from a drive range selector, an accelerator pedal, and/or a brake pedal), the ECU 38 determines what is required and then manipulates the selectively operated components of the hybrid transmission 110 appropriately to respond to the operator demand.

For example, in the exemplary embodiment shown in FIG. 4, when the operator has selected a forward drive range and manipulates either the accelerator pedal or the brake pedal, the ECU 38 determines if the vehicle should accelerate or decelerate. The ECU 38 also monitors the state of the power sources and determines the output of the transmission required to affect the desired rate of acceleration or deceleration. Under the direction of the ECU 38, the transmission is capable of providing a range of output speeds from slow to fast in order to meet the operator demand.

The transmission 110 operates as a two-mode, compound-split, electro-mechanical, vehicular transmission. In other words, the output member 164 receives power through two distinct gear trains within the transmission 110. A first mode, or gear train, is selected when the torque transfer device 170 is actuated in order to "ground" the outer gear member 146 of the third planetary gear set 128. A second mode, or gear train, is selected when the torque transfer device 170 is released and the torque transfer device 162 is simultaneously actuated to connect the shaft 160 to the carrier 152 of the third planetary gear set 128.

Those skilled in the art will appreciate that the ECU 38 serves to provide a range of output speeds from relatively slow to relatively fast within each mode of operation. This combination of two modes with a slow to fast output speed range in each mode allows the transmission 110 to propel a vehicle from a stationary condition to highway speeds. Additionally, the ECU 38 coordinates operation of the transmission 110 so as to allow synchronized shifts between the modes.

First and second "modes" of operation refer to circumstances in which the transmission functions are controlled by one clutch (e.g., clutch 162 or clutch 170), and the controlled speed and torque of the motor/generators 156 and 172, all as described in U.S. Pat. No. 5,009,301 which issued on Apr. 23, 1991 to General Motors Corporation. Also, certain "ranges" of operation may be achieved by applying an additional clutch (e.g., clutch 162, 173 or 175).

When the additional clutch is applied (i.e., when two clutching mechanisms are applied), a fixed input to output speed ratio (i.e., a fixed gear ratio) is achieved, as illustrated in the truth table of FIG. 5. The rotations of the motor/generators 156 and 172 will then be dependent on internal rotation of the mechanism as defined by the clutching and proportional to the input speed. The motor/generators 156 and 172 are completely independent of engine to output power flow, thereby enabling both to be motors, both to function as generators, or any combination thereof. This allows, for instance, during acceleration in the first fixed ratio that the engine power and both units functioning as motors accepting power from the battery 42 to be additive into propelling the vehicle through third planetary gear set 128 to the output 164.

It also should be noted that the function of the transmission can at any time be switched from operation in fixed ratio to mode control by actuating the additional clutch (i.e., on or off) during a mode of operation. Determination of operation in fixed ratio or mode control is by algorithms in the ECU 38 controlling the transmission.

Additionally, the modes of operation may overlap the fixed ratios of operation. Selection of the mode or fixed ratio depends again on the driver's input and response of the vehicle thereto. In one embodiment, the first range falls within the first mode of operation when C1 and C4 (i.e., clutches 170 and 175) are engaged, and the second range falls within the first mode of operation when C2 and C1 (clutches 162 and 170) are engaged. As illustrated in FIG. 5, a third fixed ratio range is available during the second mode of operation when C2 and C4 (clutches 162 and 175) are engaged, and a fourth fixed ratio range is available during the second mode of operation when C2 and C3 (clutches 162 and 173) are engaged.

In the first mode of operation, and when the ECU 38 has determined that the operator desires to move forwardly from a stationary condition, and to accelerate, the torque transfer device 120 is engaged operatively to connect the engine 48 to the hybrid transmission 110. The torque transfer device 120 remains applied as the vehicle moves forwardly through a speed range hereinafter more fully described. The torque transfer device 162 is not applied and remains disengaged, while the torque transfer device 170 is engaged. In this situation, the engine 48 applies driving power to the outer gear member 130 of the first planetary gear set 124 such that the outer member 130 rotates in unison with the input member 112 (and thus the engine 48). The first motor/generator 156 simultaneously rotates the inner gear member 132 of the first planetary gear set 124 and the outer gear member 138 of the second planetary gear set 126 in the same direction, thus driving the carrier 136 in the same direction, which effects rotation of the inner gear member 140 of the second planetary gear set 124.

The second motor/generator 172 operates as a motor during the first mode, and as such drives sleeve shaft 166 in a direction which causes the inner gear member 148 of the third planetary gear set 128 to rotate the planet gears 150 of the third planetary gear set 128 against the outer gear member 146 of the third planetary gear set 128. The outer gear member 146 is fixed by having been grounded so that the carrier 152 drives the output member 164 in a direction required to effect forward movement of the vehicle.

The rotation of the sleeve shaft 166 effected by rotation of the second motor/generator 172 operating as a motor also rotates the inner gear member 140 of the second planetary gear set 126. Because the torque transfer device 162 remains disengaged, the carriers 136 and 144 of the first and second planetary gear sets 124 and 126, respectively, are freely rotatable, but only in unison inasmuch as the two carriers 136 and 144 are compounded. As a result, the rotation of the outer gear member 130 of the first planetary gear set 124 caused by the engine 48 and the rotation of the inner gear member 140 caused by the second motor/generator 172 force the inner gear member 132 of the first planetary gear set 124 and the conjoined outer gear member 138 of the second planetary gear set 126 to drive the first motor/generator 156 in that direction (and with that velocity), which causes the first motor/generator 56, at least initially, to serve as a generator.

In one mode, the transmission operates in the first mode from rest (i.e., the vehicle is not moving) to about 70 MPH. At speeds greater than about 70 MPH the transmission operates in the second mode.

Fixed gear ratios can also be selected, overlapping the operation of the modes, to further improve acceleration by increasing the power reaching the output 164 and/or to improve efficiency.

At about 70 MPH, the lock-up clutch 175 is engaged while the clutch 170 remains engaged. In this configuration, the transmission 110 is engaged in the first fixed ratio as defined by the third planetary gear set 128, as shown FIG. 2. When the clutch 175 is engaged, the first two gear sets 124 and 126 and motor/generators 156 and 172 rotate at the input speed and are connected with the sun gear 148 of the third planetary gear set 128. With the clutch 170 also engaged there is a speed reduction provided by the third planetary gear set 128 which results in torque being multiplied. All power is transmitted mechanically through the planetary gear sets (i.e., no torque is present in the motors/generators 156 and 172), which minimizes electrical losses and provides higher efficiency operation. However, with full torque applied in the first and second motor/generators 156 and 172, a significant increase in performance can be realized. With both motors locked together by device 175, the first and second motor/generators 156 and 172 can also share equally any regenerative power, resulting in higher braking performance with improved cooling. Only the third planetary gear set 128 is active because the torque transmitting device (or lock-up clutch) 175 locks up the first and second planetary gear sets 124 and 126. Engagement of the torque transmitting device 175 also protects the motor/generators 156 and 172 if the power flow necessary for power split operation would overload the motor/generators. Therefore, if the vehicle is towing or hauling up a hill, the motors/generators are protected.

During normal operation, only the clutch 170 would be engaged at low speeds, but if maximum power is demanded, the lock-up clutch 175 is also engaged. The first and second motors 156 and 172 may be activated with the clutch 175 to achieve maximum available horsepower. This clutch also provides the ability for all three of the engine 48 and motor/generators 156 and 172 to simultaneously propel the vehicle for maximum acceleration.

In one embodiment, at about 40 MPH, the lock-up clutch 175 is disengaged. Thereafter, the second motor/generator 172 operates as a motor. The first motor/generator 156 operates as a generator up to a point at which the first motor/generator 156 is stationary (e.g., approximately 52 MPH). The motor/generator 156 then reverses direction and operates as a motor.

The clutch 162 is engaged at, for example, about 57 MPH. With the clutches 162 and 170 engaged, a second fixed ratio is achieved (e.g., 1.7:1 as shown in FIG. 5). During the second fixed ratio, all three gear sets 124, 126, and 128 are active. The motor/generators 156 and 172 may be turned off during the engagement of the clutches 162 and 170 for fully mechanical operation. During the second fixed ratio, the motors 156 and 172 may spin freely with no torque being present. The first mode ends when the clutch 170 is turned off and the clutch 162 remains engaged for the high-efficiency second mode of operation.

In the above description, the transmission mode I as described in U.S. Pat. No. 5,009,301 is supplemented with the ability to launch in mode I, shift to fixed ratio 1, return to mode I, and then to fixed ratio 2. The actual operation in the vehicle is determined by inputs to the ECU 38. The transmission may be operated in only mode I, or any combination as necessary to improve efficiency, performance, or braking power.

In an exemplary embodiment, the outer gear members 130 and 138 in each of the first and second planetary gear sets 124 and 126 have 65 teeth, and the inner gear members 132 and 140 in each of the first and second planetary gear sets 124 and 126 have 33 teeth. The outer gear member 146 of the third planetary gear set 128 has 94 teeth, and the inner gear member 148 of the third planetary gear set 128 has 34 teeth. With the configuration of the transmission 110 heretofore described, and with the aforesaid number of teeth on the inner and outer gear members, the transmission provides a mechanical point (i.e., at about 50 MPH) while operating in the first mode, at which the first motor/generator 56 has a zero rotational speed. To complete the description as to the operation of the motor/generators in the exemplary environment described, one must consider operation of the transmission in the second mode of operation.

The transition from the first (mode I) to the second mode (mode II) of operation is achieved by disengaging the torque transfer device 170 and continuing the application of the torque transfer device 162. In a manner similar to the previously described first mode, the second mode overlaps fixed ratios as shown in FIG. 5.

At the inception of the second mode of operation, the first motor/generator 156 transitions from operating as a motor to operating as a generator. The first motor/generator 156 continues to operate as a generator during operation of the transmission 110 in the second mode while the vehicle gains speed from, for example, about 70 MPH to about 88 MPH. At about 88 MPH, the first motor/generator 156 transitions from operation as a generator back to operation as a motor as it transitions through a mechanical point wherein the motor/generator 156 has zero rotational speed. The first motor/generator 156 continues thereafter to operate as a motor.

At the beginning of the second mode of operation, the second motor/generator 172 continues to operate as a motor. In fact, the second motor/generator 172 operates as a motor until the vehicle reaches a speed of about 88 MPH, at which point it transitions to operation as a generator, and continues thereafter to operate as a generator.

With the configuration of the transmission 110 heretofore described, and with the aforesaid number of teeth on the inner and outer gear members, the transmission 110 provides two mechanical points while operating in the second mode. That is, in one embodiment, the first motor/generator 156 has a zero rotational speed at about 88 MPH, and the second motor/generator 172 has a zero rotational speed at about 208 MPH.

As illustrated in FIG. 5, third and fourth fixed ratios are available during the second mode. The third fixed ratio may be established with the simultaneous engagement of the clutches 162 and 175, which locks all gear sets into a 1:1 ratio so that the output 164 rotates at the same speed as the input 112.

The fourth fixed ratio is established with the engagement of the clutches 162 and 173 to provide a fixed overdrive ratio of 0.74:1, as shown in FIG. 2. In the fourth fixed ratio, the first and second planetary gear sets 124 and 126 are active, and the motors/generators 156 and 172 may freewheel with no torque present.

Accordingly, the transmission 110 provides three mechanical points and four available fixed ratios, thereby minimizing electrical losses in the motors/generators while providing maximum power quickly in the first mode via the lock-up clutch 175.

It should be understood that the exact location of the aforesaid mechanical points is determined not only by the number of teeth on the inner and outer gear members of the planetary gear sets, but also by the rotational speed of the input shaft 112. Hence, with the number of teeth disclosed for the inner and outer gear members in the exemplary embodiment, an increase in the speed of the input shaft 112 will shift the locations of the mechanical points to higher vehicular speeds, and conversely, a reduction in the speed of the input member 112 will shift the mechanical points to lower vehicular speeds.

The reverse mode of operation is effected by having the ECU 38 operate the second motor/generator 172 as a motor, but reversing its rotational direction from the direction in which the second motor/generator 172 rotates when the vehicle begins to move forwardly from a stationary position in the first mode of operation.

Thus, the two-mode, compound-split, electro-mechanical transmission 110 uses a lock-up clutch and provides four available mechanical points. It enables maximum power to be reached more quickly for towing and hauling, and enables the use of smaller electrical components. By providing fixed ratios in an electrically variable transmission, maximum fuel economy is achieved at a reasonable cost.

The lock-up clutch 175 shown schematically between the planet carrier 144 and the sun gear 140 may also be located to connect the ring gear 138 and the sun gear 140 and will provide the same lockup function. Alternatively, the lock-up clutch 175 may connect the sun gear 140 and ring gear 148 of the second planetary gear set 126. As a further alternative, the lock-up clutch 175 may connect the carrier 136 and ring gear 130 of the first planetary gear set 124.

In accordance with aspects of this particular invention, during operation, still referring to FIG. 1, the vehicle 30 is operated by providing power to the wheels 36 with the combustion engine 48 and the electric motor assembly 50 in an alternating manner and/or with the combustion engine 48 and the electric motor assembly 50 simultaneously. In order to power the electric motor assembly 50, DC power is provided from the battery 42 to the inverter 44, which converts the DC power into AC power, before the power is sent to the electric motors 156 and 172. As will be appreciated by one skilled in the art, the conversion of DC power to AC power is substantially performed by operating (i.e., repeatedly switching) the transistors within the inverter 44 at a "switching frequency," such as, for example, 12 kilohertz (kHz).

Referring again to FIG. 2, generally, the controller 56 produces a Pulse Width Modulation (PWM) signal for controlling the switching action of the inverter 44. In a preferred embodiment, the controller 56 preferably produces a discontinuous PWM (DPWM) signal having a single zero vector associated with each switching cycle of the inverter 44. The inverter 44 then converts the PWM signal to a modulated voltage waveform for operating the motor 50.

To optimize the operation of the motor 50, the modulator 58 monitors the modulated voltage waveform produced by the inverter 44 and determines when the switching of the inverter 44 is operating in a distortion region that is based on non-linear limitations (e.g., minimum pulse width and dead time) associated with the inverter 44. When the inverter 44 is operating in the distortion region, the modulator 58 instructs the controller 56 to transmit a modified DPWM signal that compensates for the distortion region (e.g., by varying a duty cycle for each phase leg of the switching cycle).

DPWM control methods introduce distortion in the applied output voltage due to the inverter non-linearity of dead-time and minimum pulse width limitations. According to one embodiment of the present invention, a method to apply various compensation methods on the DPWM control is provided, which allows for a minimized amount of distortion across the enter system operating range.

The minimum non-zero on duration of a particular DPWM control cycle may be defined as $t_{min}$ while the maximum non-continuous on duration of a particular DPWM control cycle may be defined as $t_{max}$. As will be appreciated by one skilled in the art, the physical time intervals defined by $t_{min}$ and $t_{max}$ can be determined from the hardware used (inverter switches and gate driver) in addition to the flexibility of the available hardware used to implement the desired DPWM method. For example, some hardware implementations of the controller may make the time intervals more or less restrictive, in some, or all cases. From the physical time intervals, non-clamped limits on duty cycle may be expressed as $$d_{min} = \frac{1}{t_s} t_{min} \qquad (1)$$

$$d_{max} = \frac{1}{t_s} t_{max} \qquad (2)$$

where $t_s$ represents the time interval of the DPWM control cycle. The inverse of the control cycle yields the inverter switching frequency or carrier frequency ($f_s$). Mathematically, the carrier frequency may be expressed as $$f_s = \frac{1}{t_s} \qquad (3)$$

Furthermore, it can be appreciated that a variable carrier frequency may be employed that is bounded such that $$f_{s\_min} \leq f_s \leq f_{s\_max} \qquad (4)$$

It should be noted that due to a changeable carrier frequency, the maximum and minimum non-clamped duty cycles which can be achieved at the particular operation point also change with the carrier frequency according to Equations 1-4 as expressed above.

The modulation index of the PWM signal defines the amplitude of the fundamental component of the output voltage. This is often defined in terms of the maximum fundamental output voltage which can be produced by the inverter in the six-step operation that is described below. The modulation index is then given as $$M_i = \frac{V_1^*}{\frac{2}{\pi} V_{dc}} \qquad (5)$$

where $V_1^*$ is the commanded amplitude of the fundamental component and $V_{dc}$ is the maximum output voltage of the battery 42.

In accordance with one embodiment of the present invention, a control method is provided which selects an optimum DPWM compensation method based on the operating conditions of the electric drive system. In particular, the selection of the appropriate compensation method may be based at least in part on the present modulation index within the electric drive system. In one embodiment, the control method selects between three compensation methods (i.e., a first, a second, and a third method).

The three compensation methods may be generalized as a "low modulation (LowMod) index compensation method," a "mid-modulation (MidMod) index compensation method," and a "high modulation (HighMod) index compensation method." As suggested by the generalized labels provided, the LowMod (or first) compensation method is employed during instances of relatively low modulation indices, the MidMod (or second) compensation method is employed during instances of a mid-range of modulation indices, and the HighMod (or third) compensation method is employed during instances of relatively high modulation indices. Examples of these compensation methods are described in detail below.

Figure 6:
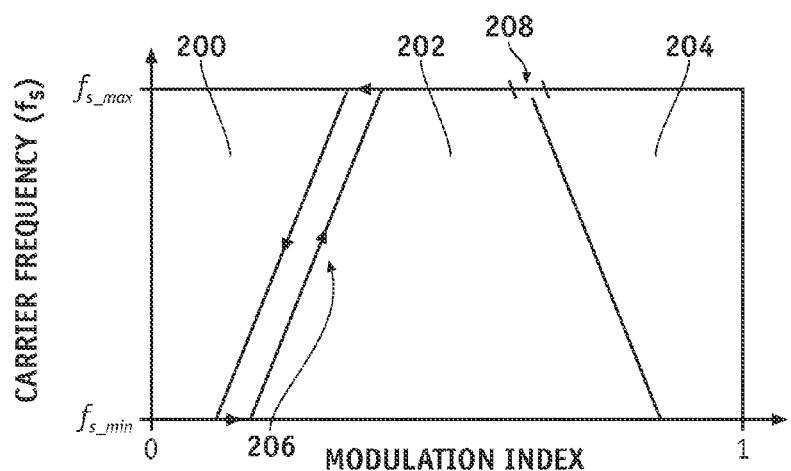
FIG. 6 is a graphical comparison of a modulation index and switching frequency of the voltage source inverter system shown in FIG. 2 illustrating a method for switching between first, second, and third compensation methods in accordance with one embodiment of the present invention.

FIG. 6 is graphical illustration of the use of each of the compensation methods in relation to the modulation index and carrier frequency ($f_s$) of the electric drive system according to the control method of one embodiment of the present invention. As shown, the graph includes a region for each of the compensation methods: a LowMod region 200, a MidMod region 202, and a HighMod region 204. As FIG. 6 illustrates, the LowMod compensation method is employed (i.e., utilized or applied) during periods in which the system is applying a low modulation index (i.e., within the LowMod region 200) to the motor. During periods of medium modulation indices (i.e., within the MidMod region 202), the method applies the MidMod compensation method. When near the boundary between the LowMod region 200 and the MidMod region 202, the method chooses the desired compensation method employing a hysteresis 206 (or other blending method) band between the two respective compensation methods.

In one embodiment, the lower boundary of the hysteresis band on the LowMod region 200 is determined approximately from $$M_{iLowMod\_max} = \frac{\pi}{\sqrt{3}} d_{min} \quad (6)$$

and the boundary between the MidMod region 202 and HighMod region 204 is found approximately from $$M_{iMidMod\_max} = \frac{1}{\sqrt{3}} \frac{\pi}{2} d_{max} \quad (7)$$

The control method may utilize several possible methods to transition between the compensation regions 200, 202, and 204. In one preferred embodiment, the system applies the HighMod compensation method if the carrier frequency is at its maximum value ($f_{s\_max}$) and the controller 56 determines that the modulation index calculated by Equation 7 is in the HighMod region 204. If both conditions are satisfied, the controller 56 applies the HighMod compensation method with an additional hysteresis band 208 (or other blending method) such that the system re-enters the MidMod compensation method if the requested modulation index decreases. In the event that the controller 56 determines that the modulation index calculated by Equation 7 is in the HighMod region, but the switching frequency is not at its maximum value, the controller 56 applies the LowMod compensation method.

In a second preferred embodiment, the controller 56 applies the HighMod compensation method independent of the carrier frequency. The additional hysteresis band 208 is provided in such an embodiment as well, near the boundary between the MidMod region 202 and the HighMod region 204, with the upper boundary of the MidMod compensation hysteresis band provided by Equation 7.

In a third preferred embodiment, the controller 56 applies the LowMod compensation method at all modulation indexes whether or not an additional compensation method (i.e. MidMod or HighMod compensation) is employed. In such an embodiment, it will be appreciated that the compensation limits (i.e. $d_{max}$ and $d_{min}$) are chosen to be less restrictive then those used to apply any additional compensation methods so that the LowMod compensation method does not interfere the operation of the other potential compensation methods.

As such, the signal is modified utilizing a first voltage distortion compensation method if a modulation index of the signal is less than a first modulation index value. The signal is modified utilizing a second voltage distortion compensation method if the modulation index is at least equal to (i.e., greater than or equal to) the first modulation index value.

In one embodiment, the signal is modified utilizing a third voltage distortion compensation method if the modulation index is at least equal to a second modulation index value, being greater than the first, and a switching frequency of the power inverter is at a maximum value. The signal is modified utilizing the first voltage distortion compensation method if the modulation index is at least equal to the second modulation index value and the switching frequency of the power inverter is not at the maximum value. In another embodiment, the signal is modified utilizing a third voltage distortion compensation method if the modulation index is at least equal to a second modulation index value that is greater than the first modulation index value.

LowMod Compensation Method

In the LowMod compensation method, in one embodiment, the effect of the distortions is reduced by maintaining an average output voltage in the distortion region. To maintain an average output voltage in the lower output voltage distortion range (e.g., between the minimum achievable duty cycle and the minimum pulse width), the duty cycle may be modified such that output voltage associated with the minimum pulse width is produced during one half of the lower output voltage distortion range. Similarly, to maintain an average output voltage in the upper output voltage distortion range (e.g., between the maximum pulse width and the maximum achievable duty cycle), the duty cycle may be modified such that output voltage associated with the maximum pulse width is produced during one half of the upper output voltage distortion range.

Upper and lower clipping values may be used to indicate when to modify the duty cycle and when the duty cycle is in the output voltage distortion range. For example, in one embodiment, the duty cycle is modified to the minimum achievable duty cycle (discrete zero) if the duty cycle is less than the lower clipping value. The duty cycle is modified to the minimum pulse width if the duty cycle is greater than or equal to the lower clipping value. The duty cycle is modified to the maximum pulse width if the duty cycle is greater than the maximum pulse width. The duty cycle is modified to the maximum achievable duty cycle if the duty cycle is greater than the upper clipping value.

In another embodiment, the lower and upper clipping values are selected as the mid-points of the respective distortion ranges (e.g., lower and upper output voltage distortion ranges) although the clipping values may be selected at any point between the respective distortion ranges. For example, the lower clipping value is selected as the mid-point between the minimum achievable duty cycle and the minimum pulse width, and the upper clipping value is selected as the mid-point between the maximum pulse width and the maximum achievable duty cycle. If the duty cycle is outside of the distortion range, the duty cycle is not modified to reduce distortion effects and is retained in the signal supplied to the inverter 44.

Figure 7:
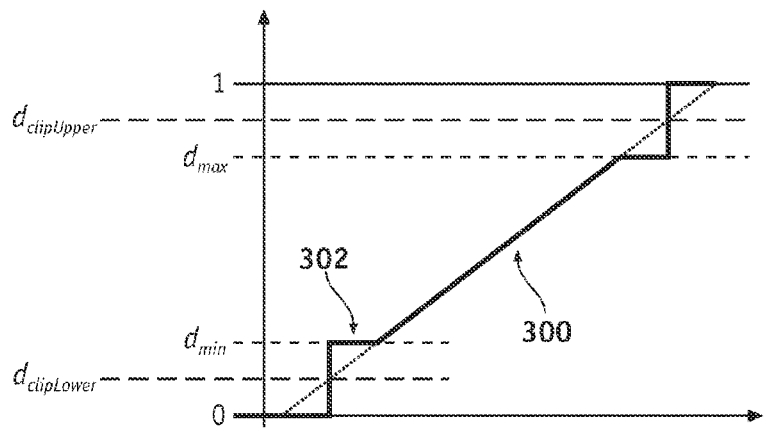
FIG. 7 is a waveform illustrating the relation between phase duty cycle and pulse width useful in understanding the voltage source inverter system of FIG. 2.

FIG. 7 is graphical illustration of the relationship between phase duty cycle and pulse width and is useful in understanding the voltage source inverter system 54 shown in FIG. 2, particularly with respect to the LowMod compensation method. An ideal duty cycle 300 and a duty cycle 302 modified in accordance with one embodiment of the LowMod compensation method are shown. The minimum and maximum pulse widths ($d_{min}$, $d_{max}$) delineate a boundary for the output voltage distortion range. For example, the output voltage distortion range is below the minimum pulse width ($d_{min}$) and above the maximum pulse width ($d_{max}$) and limited by the minimum achievable duty cycle (e.g., discrete zero) and the maximum achievable duty cycle (e.g., discrete one), respectively. In this embodiment, the lower clipping value ($d_{clipLower}$) is the mid-point between the minimum achievable duty cycle (discrete zero (0)) and the minimum pulse width ($d_{min}$), and the upper clipping value ($d_{clipUpper}$) is the mid-point between the maximum pulse width ($d_{max}$) and the maximum achievable duty cycle (discrete one (1)). The second clipping value (e.g., $d_{clipUpper}$) is greater than the first clipping value (e.g., $d_{clipLower}$). The minimum and maximum pulse widths are based on preventing a short-circuit of the switching circuit.

Figure 8:
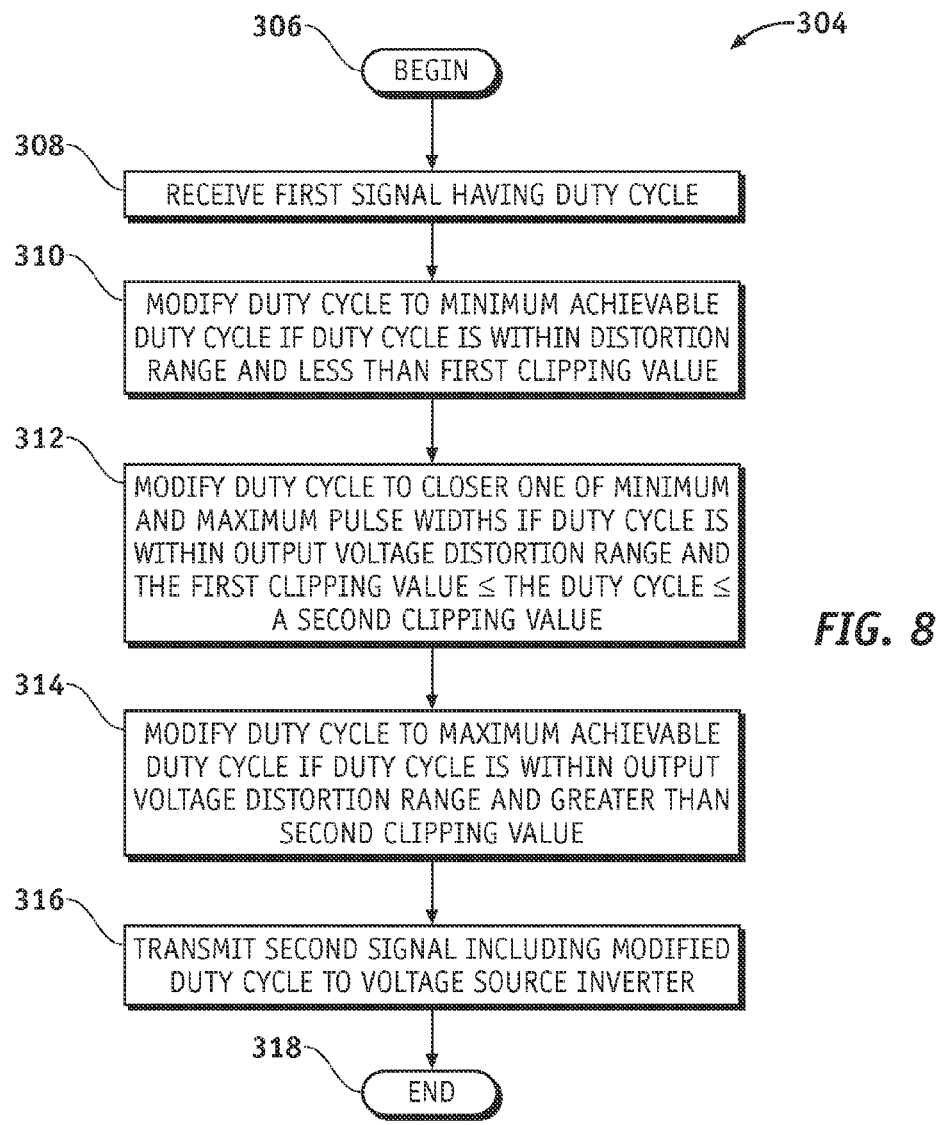
FIG. 8 is a flow diagram of the first compensation method in accordance with an exemplary embodiment of the present invention.

FIG. 8 is flow diagram of a method 304 for controlling a voltage source inverter in accordance with an exemplary embodiment of the LowMod compensation method. Referring to FIGS. 2 and 8, the inverter 44 has an output voltage distortion range. For example, in FIG. 8, the output voltage distortion range lies between the minimum achievable duty cycle (e.g., a discrete zero) and the minimum pulse width (e.g., $d_{min}$), as well as between the maximum pulse width (e.g., $d_{max}$) and a maximum achievable duty cycle (e.g., a discrete one). The method 304 begins at step 306, and a first signal having a duty cycle is received at step 308. For example, the modulator 58 receives a PWM signal from the controller 56. The duty cycle has a range from the minimum achievable duty cycle (e.g., a discrete zero) to the maximum achievable duty cycle (e.g., a discrete one).

The duty cycle is modified to the minimum achievable duty cycle (e.g., discrete zero) if the duty cycle is within the output voltage distortion range and less than a first clipping value (e.g., $d_{clipLower}$), as indicated at step 310. The duty cycle is modified to a closer one of the minimum and maximum pulse widths if the duty cycle is within the output voltage distortion range, the duty cycle is greater than or equal to the first clipping value, and the duty cycle is less than or equal to a second clipping value, as indicated at step 312. In one embodiment, the duty cycle is modified to the minimum pulse width if the duty cycle is within the output voltage distortion range and greater than or equal to the first clipping value, and the duty cycle is modified to the maximum pulse width if the duty cycle is within the output voltage distortion range and less than or equal to the second clipping value. The first clipping value may be selected to be about a mid-point between the minimum achievable duty cycle and the minimum pulse width, and the second clipping value may be selected to be about a mid-point between the maximum achievable duty cycle and the maximum pulse width.

At step 314, the duty cycle is modified to the maximum achievable duty cycle if the duty cycle is within the output voltage distortion range and greater than the second clipping value. A second signal is transmitted (e.g., by the modulator 58) to the inverter 44, as indicated at step 316. The second signal comprises the duty cycle (e.g., modified or unmodified based on the preceding steps). For example, the duty cycle of the first signal is retained in the second signal if the duty cycle is outside of the output voltage distortion range. In one embodiment, the first and second signals are DPWM signals for controlling the switch network of the inverter 44. The method 304 ends at step 318.

The inverter 44 has a first average output voltage associated with the output voltage distortion range (e.g., between the minimum achievable duty cycle and the minimum pulse width). Additionally, the inverter 44 has a second average output voltage associated with the output voltage distortion range (e.g., between the maximum pulse width and the maximum achievable duty cycle). In this embodiment, the first average output voltage is maintained if the duty cycle is greater than or equal to the minimum achievable duty cycle and the duty cycle is less than the minimum pulse width. Additionally, the second average output voltage is maintained if the duty cycle is greater than the maximum pulse width and the duty cycle us less than or equal to the maximum achievable duty cycle.

Figure 9:
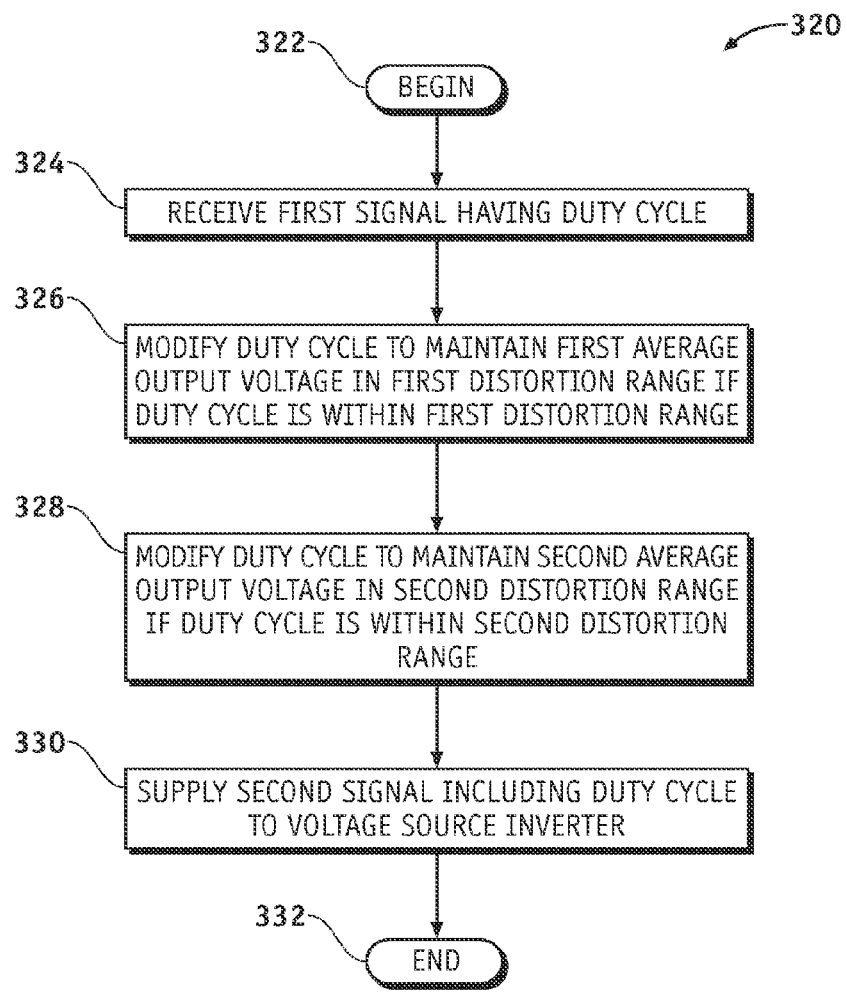
FIG. 9 is a flow diagram of the first compensation method in accordance with another exemplary embodiment of the present invention.

FIG. 9 is flow diagram of a method 320 for controlling a voltage source inverter in accordance with another exemplary embodiment of the LowMod compensation method. Referring to FIGS. 2 and 9, the method 320 begins at step 322, and a first signal is received (e.g., by the modulator 58) having a duty cycle at step 324. The duty cycle has a range from the minimum achievable duty cycle (e.g., discrete zero) to the maximum achievable duty cycle (e.g., discrete one). The duty cycle is modified to maintain a first average output voltage in the first distortion range if the duty cycle is within the first distortion range, as indicated at step 326. In one embodiment, the duty cycle is modified to the minimum achievable duty cycle if the duty cycle is within the first distortion range and less than a clipping value (e.g., $d_{clipLower}$) within the first distortion range, and the duty cycle is modified to the minimum duty cycle if the duty cycle is within the first distortion range and greater than or equal to the clipping value. The clipping value (e.g., $d_{clipLower}$) may be selected to be about a mid-point between the minimum achievable duty cycle and the minimum pulse width. In another embodiment, the duty cycle is modified to the minimum achievable duty cycle if the duty cycle is greater than or equal to the minimum achievable duty cycle and the duty cycle is less than the clipping value, and the duty cycle is modified to the minimum pulse width if the duty cycle is greater than or equal to the clipping value and the duty cycle is less than the minimum pulse width.

The duty cycle is modified to maintain a second average output voltage in the second distortion range if the duty cycle is within the second distortion range, as indicated at step 328. In one embodiment, the duty cycle is modified to the maximum pulse width if the duty cycle is within the second distortion range and less than or equal to a clipping value (e.g., $d_{clipUpper}$) within the second distortion range, and the duty cycle is modified to the maximum achievable duty cycle if the duty cycle is within the second distortion range and greater than the clipping value. In another embodiment, the duty cycle is modified to the maximum pulse width if the duty cycle is greater than the maximum pulse width and the duty cycle is less than the clipping value, and the duty cycle is modified to the maximum achievable duty cycle if the duty cycle is greater than the clipping value and the duty cycle is less than or equal to the maximum achievable duty cycle.

A second signal is supplied to the inverter 44, as indicated at step 330, and the method ends at step 332. The second signal includes the duty cycle. For example, the duty cycle of the first signal is retained in the second signal if the duty cycle is outside of the first distortion range and outside of the second distortion range (e.g., between $d_{min}$ and $d_{max}$).

MidMod Compensation Method

Figure 10:
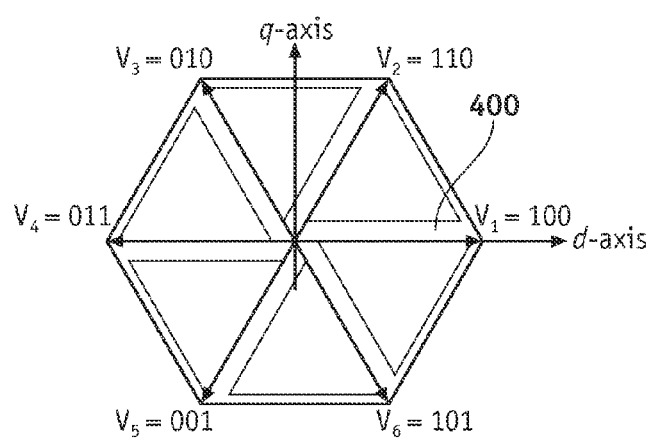
FIGS. 10-12 are graphs of inverter output voltage having distortion regions useful in further understanding the voltage source inverter system of FIG. 2.
Figure 11:
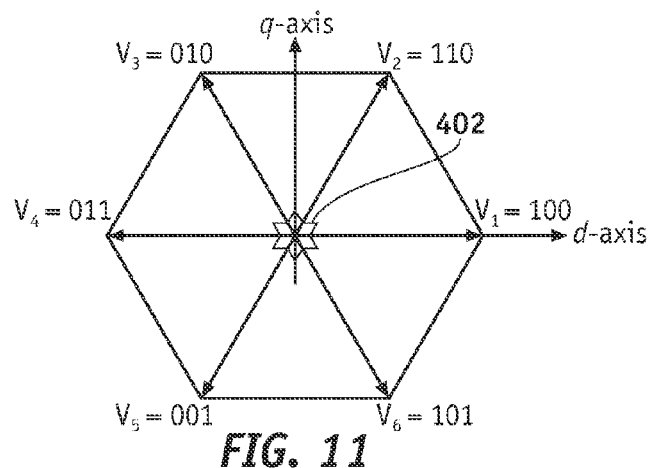
Figure 12:
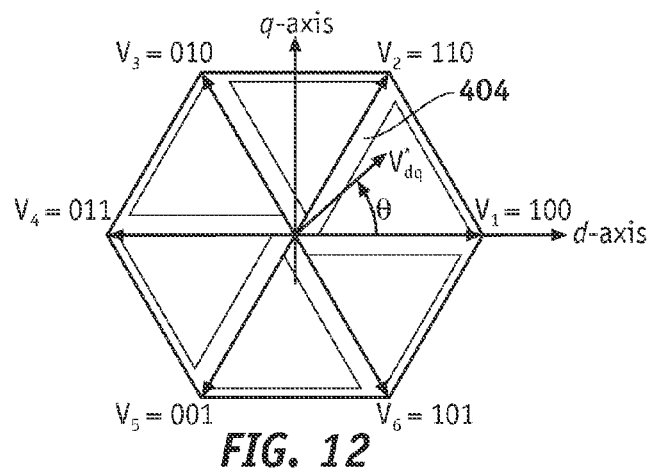

FIGS. 10-12 are graphs of inverter output voltages, having distortion regions, useful in understanding the voltage source inverter system 54 shown in FIG. 2, particularly with respect to the MidMod compensation method. The inverter output voltages are represented by vectors $V_1$, $V_2$, $V_3$, $V_4$, $V_5$, and $V_6$ corresponding to the switching for each phase (e.g., each of three phases) of the switching cycle. Each of the phases has two states (i.e., corresponding to discrete one and zero). For example, referring to FIGS. 3 and 10-12, $V_1$ is the voltage vector corresponding to a discrete one state of the first pair of switches 60 and 66 and a discrete zero state of each of the second and third pairs of switches 62 and 68 and 64 and 70. $V_2$ is the voltage vector corresponding to a discrete one state of each of the first and second pairs of switches 60 and 66 and 62 and 68 and a discrete zero state of the third pair of switches 64 and 70. $V_3$ is the voltage vector corresponding to a discrete zero state of each of the first and third pairs of switches 60 and 66 and 64 and 70 and a discrete one state of the second pair of switches 62 and 68. $V_4$ is the voltage vector corresponding to a discrete zero state of the first pair of switches 60 and 66 and a discrete one state of each of the second and third pairs of switches 62 and 68 and 64 and 70. $V_5$ is the voltage vector corresponding to a discrete zero state of each of the first and second pairs of switches 60 and 66 and 62 and 68 and a discrete one state of the third pair of switches 64 and 70. $V_6$ is the voltage vector corresponding to a discrete one state of each of the first and third pairs of switches 60 and 66 and 64 and 70 and a discrete zero state of the second pair of switches 62 and 68. A zero vector (e.g., at the center of the graphs) corresponds to either a discrete one state for each of the pairs of switches 60 and 66, 62 and 68, and 64 and 70 or a discrete zero state for each of the pairs of switches 60 and 66, 62 and 68, and 64 and 70.

Figure 13:
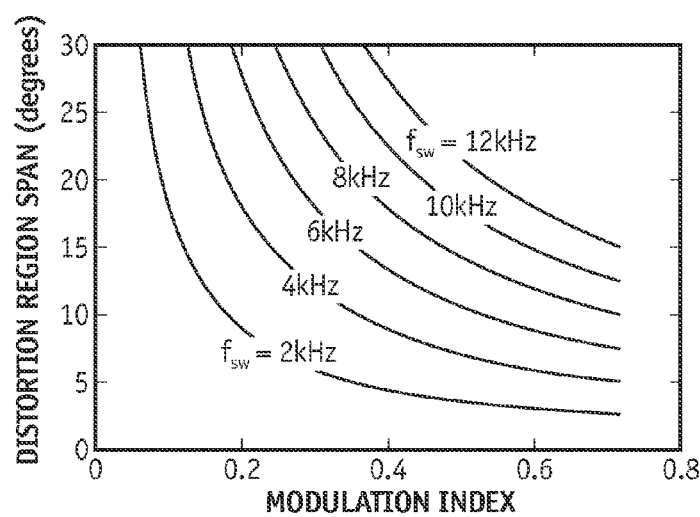
FIG. 13 is a graph of multiple distortion spans useful in further understanding the voltage source inverter system of FIG. 2.

A distortion region 400 associated with the thirty degree (30°) leading power factor load of DPWM0 is shown in FIG. 10, a distortion region 402 associated with the unity power factor load of DPWM1 is shown in FIG. 11, and a distortion region 404 associated with the thirty degree (30°) lagging power factor load associated with DPWM2 is shown in FIG. 13. Under all operating conditions, the switching network is subject to minimum pulse width limits and dead time limitations which are non-linear limitations represented by the distortion regions. Because the inverter limitations of minimum pulse width and dead time are fixed time values, the angular width (θ) or span of the distortion region, as shown in FIG. 12, varies with the modulation depth of the output voltage and the switching frequency of the switching network.

The switches 60-70 may be activated (e.g., closed) based on a modified generalized DPWM (GDPWM) method such that the clamped segment is adjusted depending upon the power factor or other condition. In general, the GDPWM method is preferable for hybrid vehicle applications because inverter losses can be decreased over continuous PWM methods. Due to the ease of modulating the zero vector, GDPWM can be configured for any operating condition. However, with GDPWM, the distortion regions are rotated by angular offset from the sector transitions, and thus the distortion regions for GDPWM continuously change. By proper control of the output pulses of the DPWM signal from the controller 56 as modified by the modulator 58, the effects of these non-linearities (represented by the distortion regions) are compensated. With GDPWM, the modulator 58 selects an appropriate zero vector based upon the maximum phase current whose angle varies with load power factor.

FIG. 13 is a graph of multiple distortion spans useful in further understanding the voltage source inverter system 54 shown in FIG. 2. The distortion spans vary based on the switching frequency (e.g., 2 kHz, 4 kHz, 6 kHz, 8 kHz, 10 kHz, and 12 kHz) and a modulation index. Because the distortion span varies with switching frequency, switching the zero vector depending solely upon the spatial location of the commanded voltage vector (e.g., in the space vector diagrams shown in FIGS. 10-12) may not be practical because the distortion regions continuously change when using GDPWM. The modified GDPWM method selects the zero vector when the output voltage vector is in a distortion region by operating on the phase duty cycle commands directly.

Figure 14:
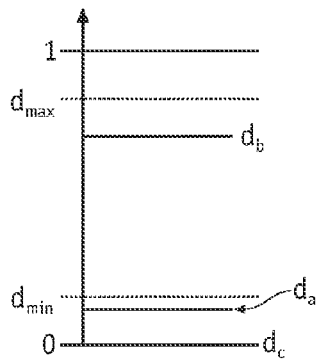
FIGS. 14-17 are phase duty cycles useful in further understanding the voltage source inverter system shown in FIG. 2.
Figure 15:
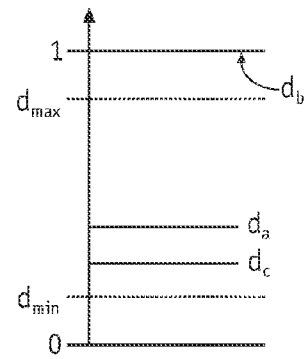

FIGS. 14-17 are phase duty cycles useful in further understanding the voltage source inverter system 54 shown in FIG. 2. FIG. 14 shows the phase duty cycles ($d_a$, $d_b$, and $d_c$) for a switching cycle. Phase duty cycle $d_a$ is in a distortion region between the minimum duty cycle ($d_{min}$) and discrete zero while phase duty cycle $d_c$ is at discrete zero. Phase duty cycle $d_b$ is between $d_{min}$ and the maximum duty cycle ($d_{max}$). FIG. 15 shows the phase duty cycles ($d_a$, $d_b$, and $d_c$) after the duty cycle of the zero vector is added to the duty cycles of each of the phase legs of the switching cycle shown in FIG. 14. In FIG. 15, phase duty cycles $d_a$ and $d_c$ are now between $d_{min}$ and $d_{max}$ and $d_b$ is now at discrete one. By adding the duty cycle of the zero vector to the duty cycles of each phase leg in the switching cycle when the output voltage vector is in the distortion region between $d_{min}$ and discrete zero, this distortion region is compensated by the voltage source inverter system 54.

Figure 16:
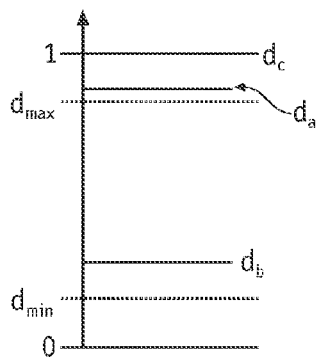
Figure 17:
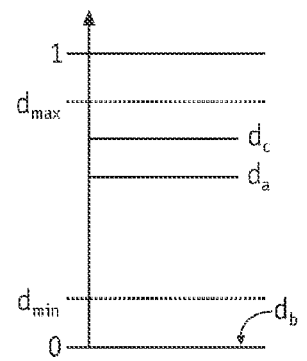

FIG. 16 shows the phase duty cycles ($d_a$, $d_b$, and $d_c$) for another switching cycle. Phase duty cycle $d_a$ is in a distortion region between $d_{max}$ and discrete one, phase duty cycle $d_c$ is at discrete one, and phase duty cycle $d_b$ is between $d_{min}$ and $d_{max}$. FIG. 17 shows the phase duty cycles ($d_a$, $d_b$, and $d_c$) after the duty cycle of the zero vector is subtracted from the duty cycles of each of the phase legs of the switching cycle shown in FIG. 16. In FIG. 17, phase duty cycles $d_a$ and $d_c$ are now between $d_{min}$ and $d_{max}$, and phase duty cycle $d_b$ is now at discrete zero. By subtracting the duty cycle of the zero vector from the duty cycles of each phase leg in the switching cycle when the output voltage vector is in the distortion region between $d_{min}$ and discrete zero, this distortion region is compensated by the voltage source inverter system 54.

Referring back to FIG. 2, in an exemplary embodiment, the modulator 58 transmits a control signal or modulation signal to the controller 56 when the output voltage vector is in the distortion region. This control signal or modulation signal changes the DPWM signal by changing duty cycle of each of the phase legs in the switching cycle by a duty cycle of the zero vector. For example, when a phase leg of the switching cycle is less than $d_{min}$ (and not discrete zero), the modulator 58 adds the duty cycle of the zero vector to each of the phase legs in the switching cycle. When a phase leg of the switching cycle is greater than $d_{max}$ (and not discrete one), the modulator 58 subtracts the duty cycle of the zero vector from each of the phase legs in the switching cycle. The controller 56 transmits the modified DPWM signal to the inverter 44.

Figure 18:
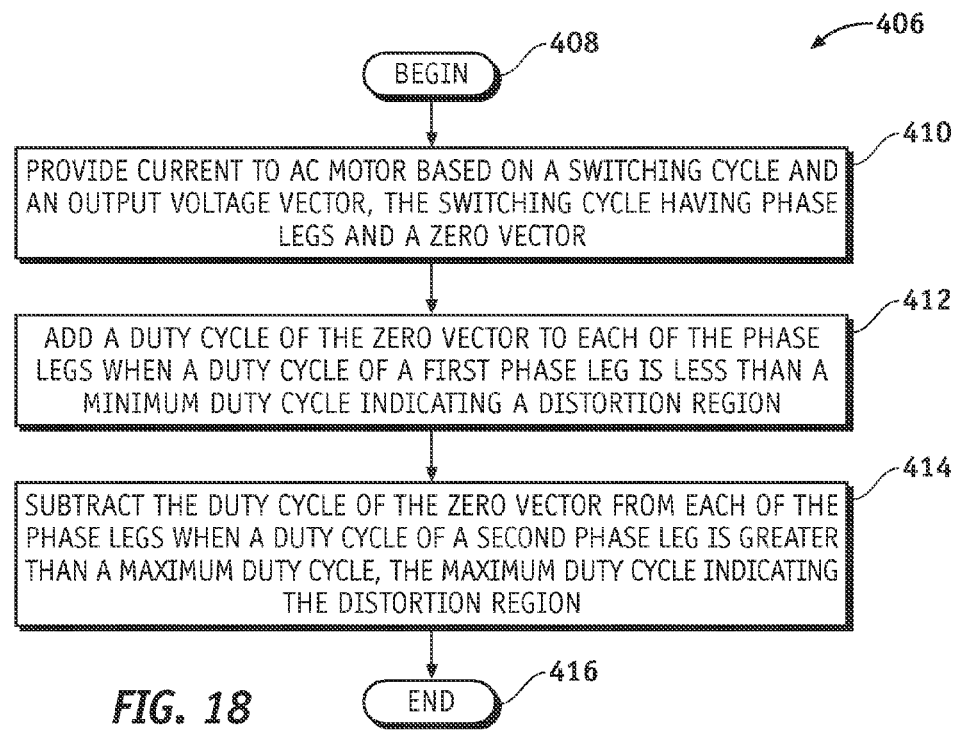
FIG. 18 is a flow diagram of the second compensation method in accordance with an exemplary embodiment of the present invention.

FIG. 18 is flow diagram of a method 406 for controlling a voltage source inverter in accordance with an exemplary embodiment of the MidMod compensation method. The method begins at step 408. A voltage is provided to the motor 50 based on a switching cycle and an output voltage vector at step 410. The switching cycle has a plurality of phase legs and has a zero vector. A duty cycle of each of the plurality of phase legs is modified by a duty cycle of the zero vector when the output voltage vector is in a distortion region. At step 412, when a duty cycle of a first phase leg of the switching cycle is less than a minimum duty cycle, which indicates the distortion region, a duty cycle of the zero vector is added to each of the plurality of phase legs. At step 414, when a duty cycle of a second phase leg is greater than a maximum duty cycle, which indicates the distortion region, the duty cycle of the zero vector is subtracted from each of the plurality of phase legs. The method 206 ends at step 416.

HighMod Compensation Method

Figure 19:
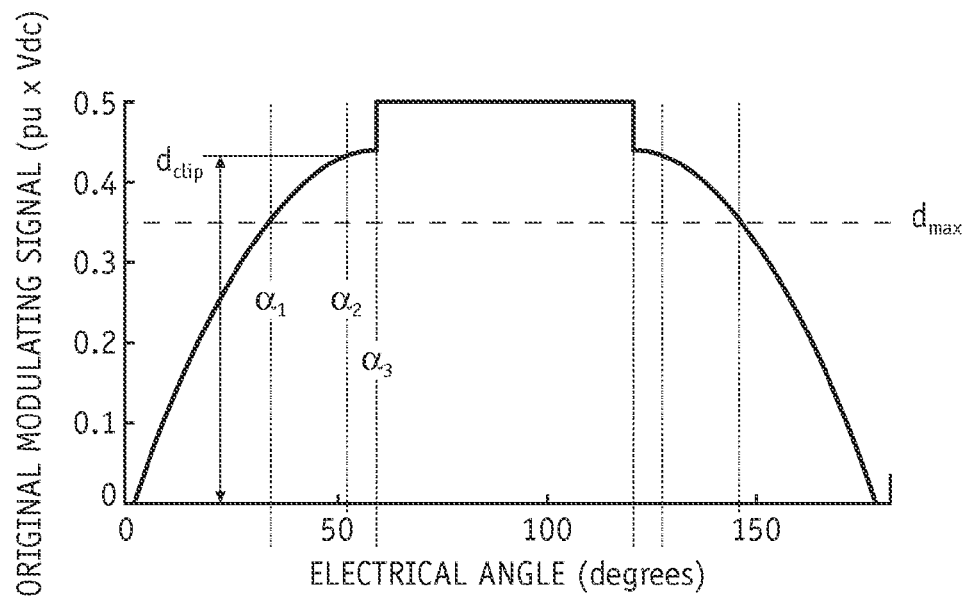
FIG. 19 is an input modulation waveform useful in further understanding the voltage source inverter system of FIG. 2.

FIG. 19 is an input modulation waveform useful in explaining the operation of the voltage source inverter system 54 shown in FIG. 2, particularly with respect to the HighMod compensation method. For simplicity of explanation, the input modulation waveform is shown and described with respect to the duty cycles associated with the positive half wave of an input modulation signal (e.g., a PWM signal) provided to the inverter 44. The input modulation waveform also includes a substantially symmetrical negative half wave for each fundamental cycle of the input modulation signal. Additionally, the positive half wave of the input modulation signal corresponds to a single phase leg of the inverter 44. Once the modulation index ($M_i$) increases beyond a value where a commanded duty cycle (d) is greater than a maximum duty cycle limit ($d_{max}$) or less than a minimum duty cycle limit ($d_{min}$), the input-output voltage relationship of the voltage source inverter may become non-linear.

Figure 20:
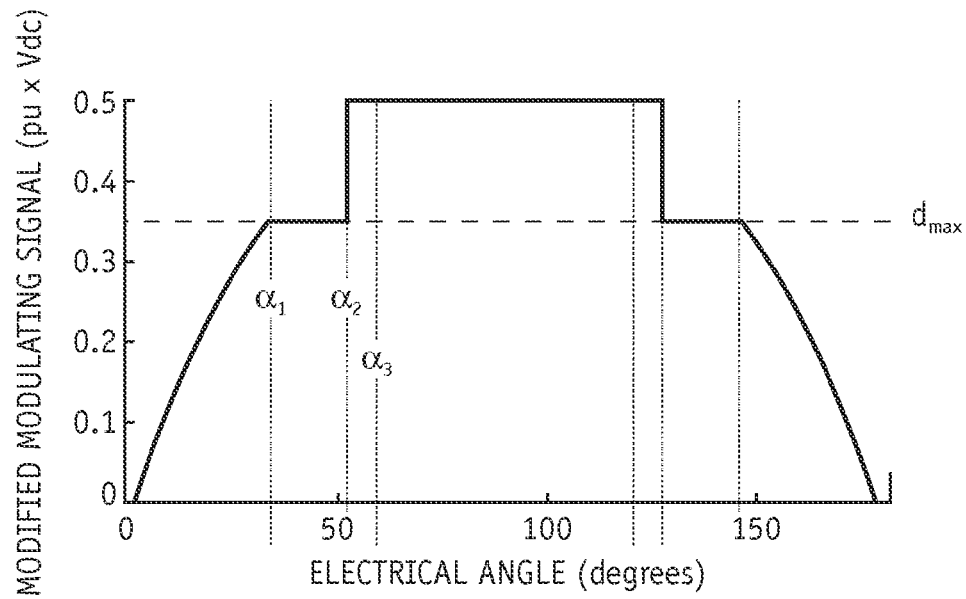
FIG. 20 is an input modulation waveform useful in further understanding the voltage source inverter system of FIG. 2.

FIG. 20 is an output modulation waveform useful in further explaining the operation of the voltage source inverter system 54 shown in FIG. 2. For simplicity of explanation, the output modulation waveform is shown and described with respect to the duty cycles associated with the positive half wave of a modified modulation signal (e.g., a modified PWM signal) provided to the voltage source inverter. To substantially preserve the input-output voltage linearity of the fundamental component of the voltage source inverter, the input modulation waveform shown in FIG. 19 is limited to the maximum duty cycle limit ($d_{max}$) between first and second phase angles (e.g., $\alpha_1$ and $\alpha_2$) of the first positive half of the input modulation waveform (e.g., between about 0° and about 90°). Once the electrical phase angle of the input modulation waveform has reached the second phase angle ($\alpha_2$), the duty cycle is limited to a reference potential, such as an upper voltage rail. For a second positive half (e.g., between about 90° and about 180°), the input modulation waveform shown in FIG. 19 is similarly limited to $d_{max}$ at first and second phase angles of the second positive half that are symmetrical about 90° to the first and second phase angles ($\alpha_1$, $\alpha_2$) of the first half of the positive half of the input modulation waveform. The result of this process is the output modulation waveform shown in FIG. 20. Additionally, this process of limiting the duty cycle in the first and second halves of the positive half wave of the input modulation signal is repeated for the first and second halves of the negative half wave of the input modulation signal.

A minimum modulation index ($M_{i\_min}$) at which this compensation occurs (e.g., modification of the duty cycles of the input modulation waveform) is preferably derived from:

$$M_{i\_min} = \frac{d_{max} + 0.5}{\sqrt{3}\,k}, \qquad (8)$$

where $d_{max}$ is referenced to ±0.5, as shown in FIGS. 19 and 20, and the factor k is given as:

$$k = 2V_{dc/p} \qquad (9)$$

An over-modulation range corresponding to a maximum modulation index ($M_{i\_max}$) occurs at:

$$M_{i\_max} = p/2\sqrt{3} \approx 0.907 \qquad (10)$$

The minimum modulation index ($M_{i\_min}$) and the maximum modulation index ($M_{i\_max}$) establish a compensation range (e.g., $M_{i\_min} < M_i < M_{i\_max}$) for possible distortion to the input-output voltage relationship of the voltage source inverter.

When the modulation index ($M_i$) is in the distortion range (e.g., $M_{i\_min} < M_i < M_{i\_max}$), the first phase angle ($\alpha_1$) is a function of both the modulation index ($M_i$) and the maximum pulse width and is found by solving $$d_{max} = M_i k \sin(\alpha_1) - \tfrac{1}{2} - M_i k \sin(\alpha_i - 2\pi/\sqrt{3}) \qquad (11)$$

Once the first phase angle ($\alpha_1$) is known, the second phase angle ($\alpha_2$), which is also a function of both the modulation index ($M_i$) and the maximum pulse width, is found by solving $$M_i k = 1/\pi^2 [2 M_i k \pi \alpha_1 + 2 M_i \alpha_1 + \sqrt{3} M_i - 2\pi] + 1/\pi^2 [2\pi \cos(\alpha_1) - M_i k \pi \sin(2\alpha_1) - 2 M_i \sin(2\alpha_1 + \pi/3)] + 4/\pi d_{max}[\cos(\alpha_1) - \cos(\alpha_2)] + \pi \cos(\alpha_2) \qquad (12)$$

The value of $d_{clip}$ varies with the first and second phase angles ($\alpha_1$, $\alpha_2$) that in turn vary with the commanded modulation index ($M_i$) and the maximum pulse width. In an exemplary embodiment, the value of $d_{clip}$ may be pre-determined and stored (e.g., in a look-up table) for access by the controller 56 (FIG. 2) to determine duty cycles normally provided to the inverter 44 (FIG. 1). Using this pre-determined value of $d_{clip}$ for the commanded modulation index ($M_i$), the actual pulses transmitted to the switch network may be modified by the controller 56.

When the commanded modulation index ($M_i$) is greater than the maximum modulation index ($M_{i\_max}$), the value of $d_{clip}$ can be approximated as $$d_{clip} = \tfrac{1}{2} - \tfrac{1}{2}(\tfrac{1}{2} - d_{max}) \qquad (13)$$

Figure 21:
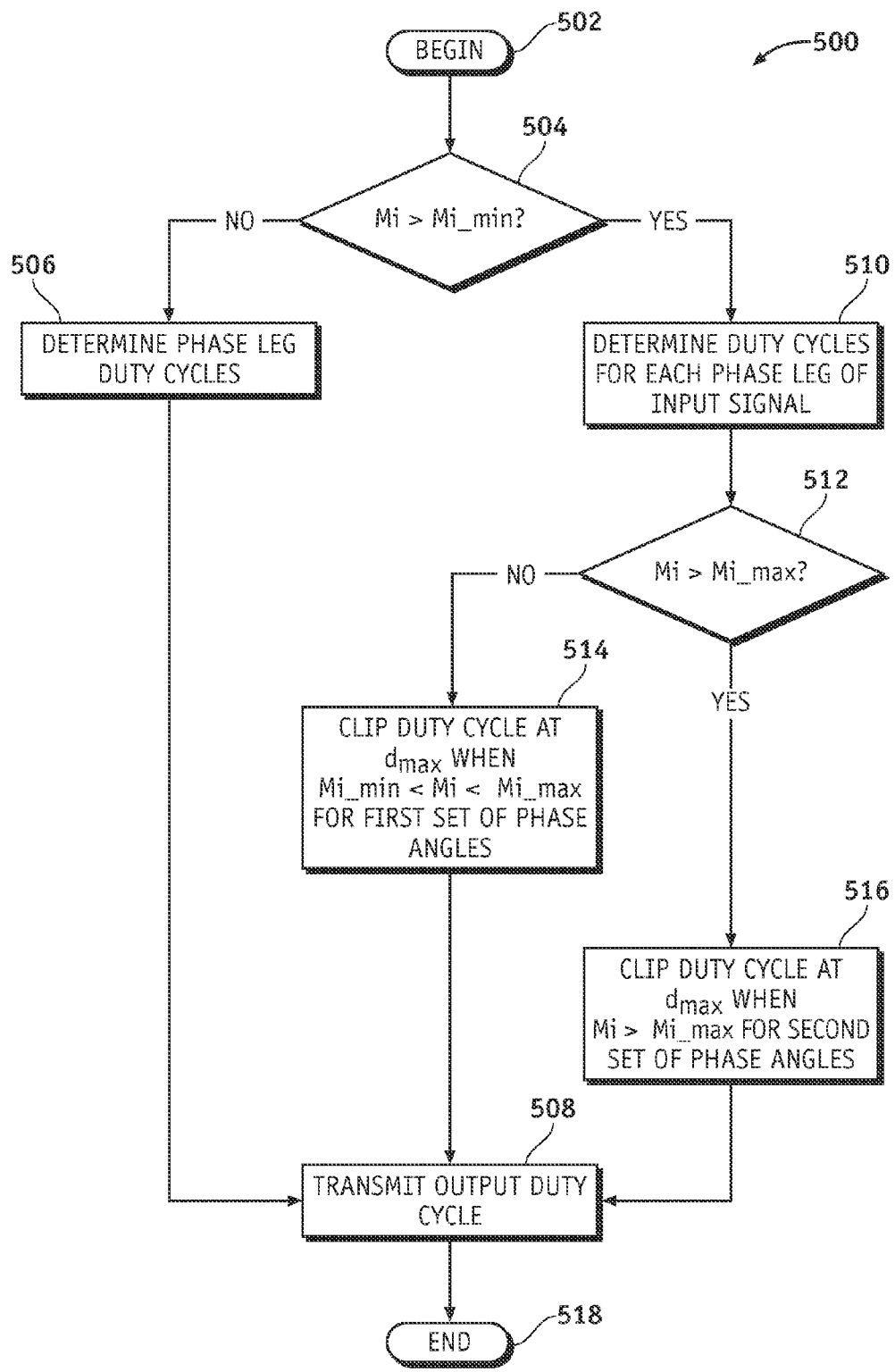
FIG. 21 is a flow diagram of the third compensation method in accordance with an exemplary embodiment of the present invention.

Referring to FIGS. 2 and 21, a method 500 of controlling a modulation signal for the inverter 44 is shown in accordance with an exemplary embodiment of the HighMod compensation method. The method 500 begins at step 502, and the controller 56 determines whether the commanded modulation index ($M_i$) is greater than the minimum modulation index ($M_{i\_min}$) at step 504. As previously mentioned, the minimum modulation index ($M_{i\_min}$) indicates a distortion range corresponding to the maximum duty cycle limit ($d_{max}$). In the event that the commanded modulation index ($M_i$) is less than the minimum modulation index ($M_{i\_min}$), the controller 56 determines the duty cycles for each phase leg of input modulation signal at step 506. For example, for a three-phase voltage source inverter, the controller 56 determines the duty cycles of the phase legs for each of the three phases. After the duty cycles are determined at step 506, the controller 56 transmits an output duty cycle to the inverter 44 at step 508.

In the event that the commanded modulation index ($M_i$) is greater than the minimum modulation index ($M_{i\_min}$), the controller 56 determines the duty cycles for each phase leg of the input modulation signal at step 510. After the duty cycles are determined at step 510, the controller 56 determines whether the commanded modulation index ($M_i$) is greater than the maximum modulation index ($M_{i\_max}$) at step 512. In the event that the commanded modulation index ($M_i$) is less than the maximum modulation index ($M_{i\_max}$), the controller 56 limits the duty cycle to the maximum duty cycle limit $d_{max}$ with a first set of phase angles ($\alpha_1$, $\alpha_2$) when the $M_{i\_min} < M_i < M_{i\_max}$ at step 514.

In an exemplary embodiment, the controller 56 clamps the input modulation signal at a first potential when the duty cycle reaches the first phase angle ($\alpha_1$), indicating the maximum duty cycle limit ($d_{max}$), and clamps the signal at a second potential when the duty cycle reaches a second phase angle ($\alpha_2$).

From Equations 9 and 10 above, in an exemplary embodiment, the over-modulation range corresponding to the maximum modulation index ($M_{i\_max}$) occurs at:

$$M_{i\_max} = p/2\sqrt{3} \approx 0.907 \quad (14)$$

The controller 56 limits the duty cycle to the maximum duty cycle limit $d_{max}$ with a second set of phase angles ($\alpha_1$, $\alpha_2$), different from the first set of phase angles, when $M_i > M_{i\_max}$ at step 516. For example, the controller 56 clamps the input modulation signal at a first potential when the duty cycle reaches the first phase angle ($\alpha_1$), indicating the maximum duty cycle limit ($d_{max}$), and clamps the signal at a second potential when the duty cycle reaches a second phase angle ($\alpha_2$) when $M_i > M_{i\_max}$.

In an exemplary embodiment, the second duty cycle limit ($d_{clip}$) is determined by:

$$d_{clip} = \frac{1}{2} - \frac{1}{2}(\frac{1}{2} - d_{max}) \quad (15)$$

After the duty cycle is limited at the second duty cycle limit at step 516, the controller 56 transmits the output duty cycle as associated with the modified signal at step 508. The method ends at step 518.

Although the exemplary embodiment of the method is shown and described with reference to a DPWM signal method, one that is switching loss optimized for a unity power factor load (e.g., DPWM1), the equations representing the various duty cycles may be modified for other DPWM signal methods.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An automotive drive system comprising:
   a prime mover power source;
   a two-mode, compound-split, electro-mechanical transmission coupled to the prime mover power source, the transmission comprising first and second motors;
   a power inverter coupled to the first and second motors; and
   a processor coupled to the first and second motors and the power inverter, the processor being configured to modify a signal controlling the power inverter utilizing a first voltage distortion compensation method if a modulation index of the signal is less than a first modulation index value;
   modify the signal utilizing a second voltage distortion compensation method if the modulation index is at least equal to the first modulation index value wherein the processor is further configured to:
      modify the signal utilizing a third voltage distortion compensation method if the modulation index is at least equal to a second modulation index value and a switching frequency of the power inverter is at a maximum value, wherein the second modulation index value is greater than the first modulation index value; and
      modify the signal utilizing the first voltage distortion compensation method if the modulation index is at least equal to the second modulation index value and the switching frequency of the power inverter is not at the maximum value.

2. The automotive drive system of claim 1, wherein the transmission further comprises:
   an input member to receive power from the prime mover;
   an output member to deliver power from the transmission;
   first, second, and third coaxially-aligned planetary gear arrangements, each planetary gear arrangement utilizing first, second and third gear members, the first and second motors being coaxially aligned with each other and with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member;
   a first torque-transmitting mechanism to selectively connect one of the gear members associated with each of the planetary gear arrangements to each other and to the output member;
   a second torque-transmitting mechanism to selectively connect one of the gear members of the third planetary gear set with ground;
   a third torque-transmitting mechanism to selectively connect one of the gear members of the second planetary gear set with another of the gear members of the second planetary gear set;
   a first interconnecting member continuously connecting one of the members of the first planetary gear set with one of the members of the second planetary gear set; and
   a second interconnecting member continuously connecting one of the members of the second planetary gear set with one of the members of the third planetary gear set.

3. The automotive drive system of claim 2, wherein the processor is further configured to modify the signal utilizing a third voltage distortion compensation method if the modulation index is at least equal to a second modulation index value, the second modulation index value being greater than the first modulation index value.

4. The automotive drive system of claim 1, wherein the first modulation index value is based at least in part on a minimum non-zero duration of a control cycle of the drive system and the second modulation index value is based at least in part on a maximum non-continuous duration of the control cycle of the drive system, the first and second modulation index values are based at least in part on the switching frequency of the power inverter, the drive system has a minimum pulse width based at least in part on the minimum non-zero duration of the control cycle of the drive system and the switching frequency of the power inverter, a maximum pulse width based at least in part on the maximum non-continuous duration of the control cycle of the drive system and the switching frequency of the power inverter, and an output voltage distortion range outside of the minimum and maximum pulse widths.

5. The automotive drive system of claim 4, wherein:
   the transmission further comprises a fourth torque-transmitting mechanism to selectively ground one of the gear members connected by the third torque-transmitting mechanism;
   the first and second motors annularly circumscribe the planetary gear arrangements and the planetary gear arrangements are disposed radially inwardly of the first and second motors; and
   the first, second, and third gear members of each planetary gear arrangement comprise a ring gear, a carrier, and a sun gear, respectively, the first interconnecting member continuously interconnects the sun gear of the first planetary gear arrangement with the ring gear of said second planetary gear arrangement, and the second interconnecting member continuously interconnects the sun gear of the second planetary gear arrangement with the sun gear of the third planetary gear arrangement.

6. A method for performing a first voltage distortion compensation method on a signal in an automotive drive system of a type that includes a prime mover power source; a two-mode, compound-split, electro-mechanical transmission coupled to the prime mover power source, the transmission comprising first and second motors; a power inverter coupled to the first and second motors; and a processor coupled to the first and second motors and the power inverter, the processor being configured to modify a signal controlling the power inverter utilizing a first voltage distortion compensation method if a modulation index of the signal is less than a first modulation index value, and wherein the first modulation index value is based at least in part on a minimum non-zero duration of a control cycle of the drive system and the second modulation index value is based at least in part on a maximum non-continuous duration of the control cycle of the drive system, the first and second modulation index values are based at least in part on the switching frequency of the power inverter, the drive system has a minimum pulse width based at least in part on the minimum non-zero duration of the control cycle of the drive system and the switching frequency of the power inverter, a maximum pulse width based at least in part on the maximum non-continuous duration of the control cycle of the drive system and a switching frequency of the power inverter, and an output voltage distortion range outside of the minimum and maximum pulse widths, wherein the signal is a first signal having a duty cycle and the first voltage distortion compensation method comprises:
   receiving the first signal, the duty cycle of the first signal having a range from a minimum achievable duty cycle to a maximum achievable duty cycle;
   producing a second signal if the duty cycle of the first signal is within the output voltage distortion range and less than a first clipping value, the second signal having the minimum achievable duty cycle;
   producing a third signal if the duty cycle of the first signal is within the output voltage distortion range and one of the duty cycle of the first signal is at least equal to the first clipping value or the duty cycle of the first signal is not greater than a second clipping value, the third signal having a closer one of the minimum and maximum pulse widths to the duty cycle of the first signal, the second clipping value being greater than the first clipping value;
   producing a fourth signal if the duty cycle of the first signal is within the output voltage distortion range and greater than the second clipping value, the fourth signal having the maximum achievable duty cycle; and
   transmitting one of the second, third, and fourth signals to the power inverter.

7. The method of claim 6, wherein the power inverter has a switching cycle with a plurality of phase legs and a zero vector and the second voltage distortion compensation method comprises:
   monitoring an output voltage vector of the power inverter, the output voltage vector being based on the switching cycle of the power inverter;
   producing a modified switching cycle by modifying a duty cycle of each of the plurality of phase legs by a duty cycle of the zero vector when the output voltage vector is in a distortion region; and
   providing an output signal to the power inverter, the signal having the modified switching cycle.

8. The method of claim 7, wherein the third voltage distortion compensation method comprises:
   determining a duty cycle limit based on the first signal;
   limiting the first signal to the duty cycle limit when the modulation index is greater than a minimum modulation index value to produce the output signal; and
   transmitting the output signal to the power inverter.

9. The method of claim 7, wherein the third voltage distortion compensation method comprises:
   determining a duty cycle limit based on the signal;
   limiting the signal to the duty cycle limit when the modulation index is greater than a minimum modulation index value to produce an output signal;
   transmitting the output signal to the power inverter; and
   modify the signal utilizing the first voltage distortion compensation method if the modulation index is at least equal to the second modulation index value and the switching frequency of the power inverter is not at the maximum value.

10. An automotive drive system comprising:
    a prime mover power source;
    a two-mode, compound-split, electro-mechanical transmission coupled to the prime mover power source, the transmission comprising:
        an input member to receive power from the prime mover;
        an output member to deliver power from the transmission;
        first and second motors being coaxially aligned;
        first, second, and third coaxially aligned planetary gear arrangements, each planetary gear arrangement utilizing first, second and third gear members, the first and second motors being coaxially aligned with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member;
    a first torque-transmitting mechanism to selectively connect one of the gear members associated with each of the planetary gear arrangements to each other and to the output member;

a second torque-transmitting mechanism to selectively connect one of the gear members of the third planetary gear set with ground;
a third torque-transmitting mechanism to selectively connect one of the gear members of the second planetary gear set with another of the gear members of the second planetary gear set;
a first interconnecting member continuously connecting one of the members of the first planetary gear set with one of the members of the second planetary gear set; and
a second interconnecting member continuously connecting one of the members of the second planetary gear set with one of the members of the third planetary gear set;
a power inverter coupled to the first and second motors;
an energy storage device coupled to the power inverter; and
a processor coupled to the first and second motors and the power inverter, the processor being configured to:
modify a signal controlling the power inverter utilizing a first voltage distortion compensation method if a modulation index of the signal is less than a first modulation index value;
modify the signal utilizing a second voltage distortion compensation method if the modulation index is at least equal to the first modulation index value;
modify the signal utilizing a third voltage distortion compensation method if the modulation index is at least equal to a second modulation index value and a switching frequency of the power inverter is at a maximum value, wherein the second modulation index value is greater than the first modulation index value; and
modify the signal utilizing the first voltage distortion compensation method if the modulation index is at least equal to the second modulation index value and the switching frequency of the power inverter is not at the maximum value.

11. The automotive drive system of claim 10, wherein the prime mover power source comprises an internal combustion engine and the energy storage device comprises a battery.

12. An automotive drive system comprising:
an internal combustion engine;
a two-mode, compound-split, electro-mechanical transmission coupled to the internal combustion engine, the transmission comprising:
an input member to receive power from the internal combustion engine;
an output member to deliver power from the transmission;
first and second motors being coaxially aligned;
first, second, and third coaxially aligned planetary gear arrangements, each planetary gear arrangement utilizing first, second and third gear members, the first and second motors being coaxially aligned with the three planetary gear arrangements, at least one of the first, second, and third gear members in the first or second planetary gear arrangement being connected to the first motor, and another one of the first, second, and third gear members in the second and third planetary gear arrangements being connected to the second motor, one of the gear members of the first planetary gear arrangement being continuously connected to the input member;
a first torque-transmitting mechanism to selectively connect one of the gear members associated with each of the planetary gear arrangements to each other and to the output member;
a second torque-transmitting mechanism to selectively connect one of the gear members of the third planetary gear set with ground;
a third torque-transmitting mechanism to selectively connect one of the gear members of the second planetary gear set with another of the gear members of the second planetary gear set;
a first interconnecting member continuously connecting one of the members of the first planetary gear set with one of the members of the second planetary gear set; and
a second interconnecting member continuously connecting one of the 30 members of the second planetary gear set with one of the members of the third planetary gear set;
a power inverter coupled to the first and second motors;
at least one battery coupled to the power inverter; and
a processor coupled to the first and second motors and the power inverter, the processor being configured to:
modify a signal, having a minimum pulse width and maximum pulse width by controlling the power inverter utilizing a first voltage distortion compensation process if a modulation index of the signal is less than index value,
receive the signal, a duty cycle of the signal having a range from a minimum achievable duty cycle to a maximum achievable duty cycle;
produce a second signal if the duty cycle of the signal is within an output voltage distortion range outside of the minimum and maximum pulse widths and less than a first clipping value, the second signal having the minimum achievable duty cycle;
produce a third signal if the duty cycle of the signal is within the output voltage distortion range and one of the duty cycle of the signal is at least equal to the first clipping value or the duty cycle of the signal is not greater than a second clipping value, the third signal having a closer one of the minimum and maximum pulse widths to the duty cycle of the signal, the second clipping value being greater than the first clipping value;
produce a fourth signal if the duty cycle of the signal is within the output voltage distortion range and greater than the second clipping value, the fourth signal having the maximum achievable duty cycle;
transmit one of the second, third, and fourth signals to the power inverter; and
modify the signal utilizing a second voltage distortion compensation process if the modulation index is at least equal to the first modulation index value;
modify the signal utilizing a third voltage distortion compensation process if the modulation index is at least equal to a second modulation index value, the second modulation index value being greater than the first modulation index value and a switching frequency of the power inverter is at a maximum value; and
modify the signal utilizing the first voltage distortion compensation process if the modulation index is at least equal to the second modulation index value and the switching frequency of the power inverter is not at the maximum value.

13. The automotive drive system of claim 12, wherein the transmission further comprises:
a fourth torque-transmitting mechanism to selectively ground one of the gear members connected by the third torque-transmitting mechanism;
the first and second motors annularly circumscribe the planetary gear arrangements and the planetary gear arrangements are disposed radially inwardly of the first and second motors; and the first, second, and third gear members of each planetary gear arrangement comprise a ring gear, a carrier, and a sun gear, respectively, the first interconnecting member continuously interconnects the sun gear of the first planetary gear arrangement with the ring gear of said second planetary gear arrangement, and the second interconnecting member continuously interconnects the sun gear of the second planetary gear arrangement with the sun gear of the third planetary gear arrangement.

14. The automotive drive system of claim 13, wherein:

the first torque-transmitting mechanism selectively connects the carriers of the first and second planetary gear arrangements with the carrier of the third planetary gear set and the output member;

the second torque-transmitting mechanism selectively connects the ring gear of the third torque-transmitting mechanism with ground;

the third torque-transmitting mechanism selectively connects the carrier or ring gear of the second planetary gear arrangement with the sun gear of the second planetary gear arrangement;

the sun gear of the first planetary gear set is connected with the first motor and the sun gear of the second planetary gear set is connected with the second motor;

the ring gear of the first planetary gear arrangement is connected with said input member; and the carrier of the third planetary gear arrangement is continuously connected with said output member.

* * * * *